(12) United States Patent
Isurugi et al.

(10) Patent No.: US 9,127,371 B2
(45) Date of Patent: Sep. 8, 2015

(54) MOLD AND PRODUCTION METHOD FOR SAME, AND ANTI-REFLECTION FILM

(75) Inventors: Akinobu Isurugi, Osaka (JP); Kiyoshi Minoura, Osaka (JP); Takao Imaoku, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 545 days.

(21) Appl. No.: 13/499,736

(22) PCT Filed: Oct. 8, 2010

(86) PCT No.: PCT/JP2010/067753
§ 371 (c)(1),
(2), (4) Date: Apr. 2, 2012

(87) PCT Pub. No.: WO2011/043464
PCT Pub. Date: Apr. 14, 2011

(65) Prior Publication Data
US 2012/0196090 A1    Aug. 2, 2012

(30) Foreign Application Priority Data
Oct. 9, 2009    (JP) ................... 2009-235746

(51) Int. Cl.
C25D 11/12    (2006.01)
G02B 1/118    (2015.01)
C25D 11/18    (2006.01)

(52) U.S. Cl.
CPC ............. C25D 11/12 (2013.01); G02B 1/118 (2013.01); C25D 11/18 (2013.01); Y10T 428/24479 (2015.01)

(58) Field of Classification Search
CPC ......... C25D 11/12; C25D 11/18; G02B 1/118
USPC ................................. 205/172, 324
See application file for complete search history.

(56) References Cited

U.S. PATENT DOCUMENTS 4,936,957 A * 6/1990 Dickey et al. ............ 205/96
5,595,638 A * 1/1997 Konuma et al. ........... 205/96
(Continued)

FOREIGN PATENT DOCUMENTS

EP    1785748 A1    5/2007
EP    2400044 A1    12/2011
(Continued)

OTHER PUBLICATIONS

International Preliminary Report on Patentability dated May 24, 2012.
(Continued)

*Primary Examiner* — Bryan D. Ripa
(74) *Attorney, Agent, or Firm* — Harness, Dickey & Pierce, P.L.C.

(57) ABSTRACT

A moth-eye mold fabrication method of an embodiment of the present invention includes the steps of: (a) anodizing a surface of an aluminum film to form a porous alumina layer which has a plurality of minute recessed portions; (b) after step (a), bringing the porous alumina layer into contact with an etching solution, thereby enlarging the plurality of minute recessed portions of the porous alumina layer; and (c) after step (b), further anodizing the surface to grow the plurality of minute recessed portions, wherein a voltage applied in step (c) is higher than a voltage applied in step (a). According to an embodiment of the present invention, a mold fabrication method is provided which is capable of preventing formation of a plurality of tiny pores in one micropore.

8 Claims, 8 Drawing Sheets

(56) References Cited

U.S. PATENT DOCUMENTS

| | | | |
|---|---|---|---|
| 6,359,735 B1 | 3/2002 | Gombert et al. | |
| 2003/0205475 A1 | 11/2003 | Sawitowski | |
| 2005/0276743 A1* | 12/2005 | Lacombe et al. | 423/447.3 |
| 2007/0159698 A1* | 7/2007 | Taguchi et al. | 359/586 |
| 2007/0235342 A1* | 10/2007 | Matsuo et al. | 205/175 |
| 2009/0194914 A1 | 8/2009 | Uozu et al. | |
| 2012/0156430 A1 | 6/2012 | Isurugi et al. | |

FOREIGN PATENT DOCUMENTS

| | | |
|---|---|---|
| EP | 2426237 A1 | 3/2012 |
| JP | 2001517319 A | 10/2001 |
| JP | 2003-277990 A | 10/2003 |
| JP | 2003531962 A | 10/2003 |
| JP | 2005156695 A | 6/2005 |
| JP | 2006-124827 A | 5/2006 |
| JP | 2008-156716 A | 7/2008 |
| WO | WO-2006059686 A1 | 6/2006 |
| WO | WO-2007/145080 A1 | 12/2007 |
| WO | WO-2008001847 A1 | 1/2008 |
| WO | WO-2011027746 A1 | 3/2011 |

OTHER PUBLICATIONS

Lee, W. et al., "Fast fabrication of long-range ordered porous alumina membranes by hard anodization", Nature Materials, vol. 5, Aug. 20, 2006, pp. 741-747.

International Search Report, of PCT/JP2010/067753 mailed Jan. 18, 2011.

Sulka et al., "Anodising potential influence on well-ordered nanostructures formed by anodisation of aluminum in sulphuric acid," Thin Solid Films 515, 2006, p. 338-345, Elsevier B.V.

* cited by examiner (a)

(b)

(c)

(a)

(b)

(c)

(a) (b) (c) (d) (e)

MOLD AND PRODUCTION METHOD FOR SAME, AND ANTI-REFLECTION FILM

TECHNICAL FIELD

The present invention relates to a mold, a method of fabricating a mold, and an antireflection film. In this specification, the "mold" includes molds that are for use in various processing methods (stamping and casting), and is sometimes referred to as a stamper. The mold can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a moth-eye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (minute recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about 1/3 of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

Patent Document 4 discloses the technique of forming an antireflection film with the use of an alumina layer in which minute recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 µm and less than 100 µm. The entire disclosures of Patent Documents 1, 2, and 4 are herein incorporated by reference.

Utilizing an anodized porous aluminum film can facilitate the fabrication of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

A known antireflection film manufacturing method with the use of a moth-eye mold uses a photocurable resin. Firstly, a photocurable resin is applied over a substrate. Then, an uneven surface of a moth-eye mold which has been provided with a mold release treatment is pressed against the photocurable resin in vacuum. Thereafter, the uneven structure is filled with the photocurable resin. Then, the photocurable resin in the uneven structure is irradiated with ultraviolet light so that the photocurable resin is cured. Thereafter, the moth-eye mold is separated from the substrate, whereby a cured layer of the photocurable resin to which the uneven structure of the moth-eye mold has been transferred is formed over the surface of the substrate. The method of manufacturing an antireflection film with the use of the photocurable resin is disclosed in, for example, Patent Document 4.

Non-patent Document 1 discloses an anodization method wherein an oxalic acid aqueous solution is used as an electrolytic solution, and a mirror-finished surface of an aluminum substrate undergoes an anodization with a relatively low voltage, e.g., 40 V (MA: mild anodization) before an anodization with a relatively high voltage, e.g., 100 V to 160 V (HA: hard anodization). The subject matter of Non-patent Document 1 is to form a porous alumina layer that has an array of micropores which has extremely high regularity by taking advantage of self organization. Non-patent Document 1 states that a self-organized porous alumina layer of high regularity with an interpore distance of 220 nm to 300 nm, which would not obtained by the conventional MA, was successfully formed according to the above method. In the MA step, to prevent occurrence of a breakdown in the HA step, it is necessary to form a porous alumina layer with a thickness of not less than 400 nm. The interpore distance is determined depending on HA.

Non-patent Document 1 also discloses a method of forming a porous alumina layer with a periodically-modulated pore diameter which is realized by alternately performing MA and HA by taking advantage of the fact that MA and HA lead to formation of porous alumina layers which are different in porosity. Non-patent Document 1 describes an example where, after imprinting of a pre-pattern with an interval of 275 nm with the use of a stamper, the MA with an applied voltage of 110 V (in a 4 wt % phosphoric acid aqueous solution) and the HA with an applied voltage of 137 V (in a 0.015 M oxalic acid aqueous solution) were alternately repeated, whereby a porous alumina layer with a high aspect ratio was formed, which had an interpore distance of 275 nm and a periodically-modulated pore diameter. The applied voltages in the MA step and the HA step were each determined such that a porous alumina layer with an interpore distance of 275 nm is formed through self organization.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686

Non-Patent Literature

Non-patent Document 1: Woo Lee, Ran Ji, Ulrich Gosele & Kornelius Nielsch, Fast fabrication of long-range ordered porous alumina membranes by hard anodization, Nature Materials 20 Aug. 2006, vol. 5, p 741-747

SUMMARY OF INVENTION

Technical Problem

The present inventors fabricated moth-eye mold samples by repeating anodization and etching of a surface of an aluminum base according to the method described in Patent Document 4. In some of the fabricated samples, in the second and subsequent anodization cycles, a plurality of tiny pores were formed in the inner surfaces of micropores that were formed in the first anodization cycle. In a structure in which a plurality of tiny pores are provided in one micropore, the interval between adjacent pores is short. For example, when a moth-eye mold which has that structure is used to fabricate an antireflection film, a phenomenon that a plurality of protrusions at a surface of a work to which the moth-eye structure has been transferred stick together into bunches, i.e., a so-called sticking phenomenon, readily occurs. In a portion in which a plurality of protrusions stick together into bunches, the property of the resultant structure as the antireflection film deteriorates as will be described later.

The present invention was conceived for the purpose of solving the above problems. One of the major objects of the present invention is to provide a mold fabrication method which is capable of preventing formation of a plurality of tiny pores in one micropore.

Solution to Problem

A mold fabrication method of the present invention is a method of fabricating a mold that has an inverted moth-eye structure in its surface, the inverted moth-eye structure having a plurality of recessed portions whose two-dimensional size viewed in a direction normal to the surface is not less than 50 nm and less than 500 nm, the method including the steps of: (a) anodizing a surface of an aluminum base to form a porous alumina layer which has a plurality of minute recessed portions; (b) after step (a), bringing the porous alumina layer into contact with an etching solution, thereby enlarging the plurality of minute recessed portions of the porous alumina layer; and (c) after step (b), further anodizing the surface of the aluminum base to grow the plurality of minute recessed portions, wherein a voltage applied in step (c) is higher than a voltage applied in step (a).

In one embodiment, a number density of the minute recessed portions after step (c) is less than 1.26 times a number density of the minute recessed portions after step (a).

In one embodiment, step (a) and step (c) are performed in a same electrolytic solution.

In one embodiment, the growth rate in a thickness direction of the porous alumina layer in step (a) is not less than 0.5 nm/sec and not more than 35 nm/sec.

In one embodiment, the growth rate in a thickness direction of the porous alumina layer in step (c) is not less than 0.5 nm/sec and not more than 35 nm/sec.

In one embodiment, step (a) and step (c) are performed in the same electrolytic solution, and the growth rate in a thickness direction of the porous alumina layer in step (a) is lower than the growth rate in a thickness direction of the porous alumina layer in step (c).

In one embodiment, the method includes, before step (a), the step of anodizing a surface of the aluminum base to form a barrier-type alumina layer.

In one embodiment, an average value of intervals of centers of the plurality of minute recessed portions is not less than 180 nm.

In one embodiment, after step (c), step (b) and step (c) are further performed.

A mold of the present invention is a mold which is fabricated according to any of the above-described fabrication methods, the mold including a porous alumina layer which has an inverted moth-eye structure in its surface, the inverted moth-eye structure having a plurality of recessed portions whose two-dimensional size viewed in a direction normal to the surface is not less than 50 nm and less than 500 nm.

Another mold of the present invention is a mold which is fabricated according to any of the above-described fabrication methods, the mold including a porous alumina layer that has an inverted moth-eye structure in its surface, the inverted moth-eye structure having a plurality of recessed portions whose two-dimensional size viewed in a direction normal to the surface is not less than 50 nm and less than 500 nm, wherein an interval of centers of the plurality of recessed portions is not less than 50 nm and less than 500 nm, the plurality of recessed portions have a conical shape, and the plurality of recessed portions have an aspect ratio of not less than 0.5 and not more than 6.0. Here, the aspect ratio of the plurality of recessed portions refers to the ratio of the two-dimensional size (diameter) to the depth of the recessed portions.

An antireflection film of the present invention is an antireflection element which is fabricated using the above-described mold, wherein a surface of the antireflection film has a plurality of raised portions whose base has a diameter of not less than 50 nm and less than 500 nm, the plurality of raised portions are arranged so as to have no periodicity, the surface has a plurality of sites at which two or more of the plurality of raised portions are in contact with one another, and a number density of the sites at which the two or more raised portions are in contact with one another is not more than 1.3 counts/ $\mu m^2$. Here, "having no periodicity" means that, for example, the distance between the vertex of a certain one of the plurality of raised portions and the vertex of a raised portion which is closest to the vertex of the certain raised portion is different from the distance between the vertex of another certain one of the plurality of raised portions and the vertex of still another one of the raised portions which is closest to the vertex of the another certain raised portion.

In one embodiment, when step (b) is performed, the porosity of the porous alumina layer increases by not less than 16% and not more than 28%. Here, the porosity of the porous alumina layer refers to the area ratio of the openings of the micropores in the unit area in the surface of the porous alumina layer.

Advantageous Effects of Invention

According to the present invention, a mold fabrication method is provided which is capable of preventing formation of a plurality of tiny pores in one micropore.

DESCRIPTION OF EMBODIMENTS

Figure 1:
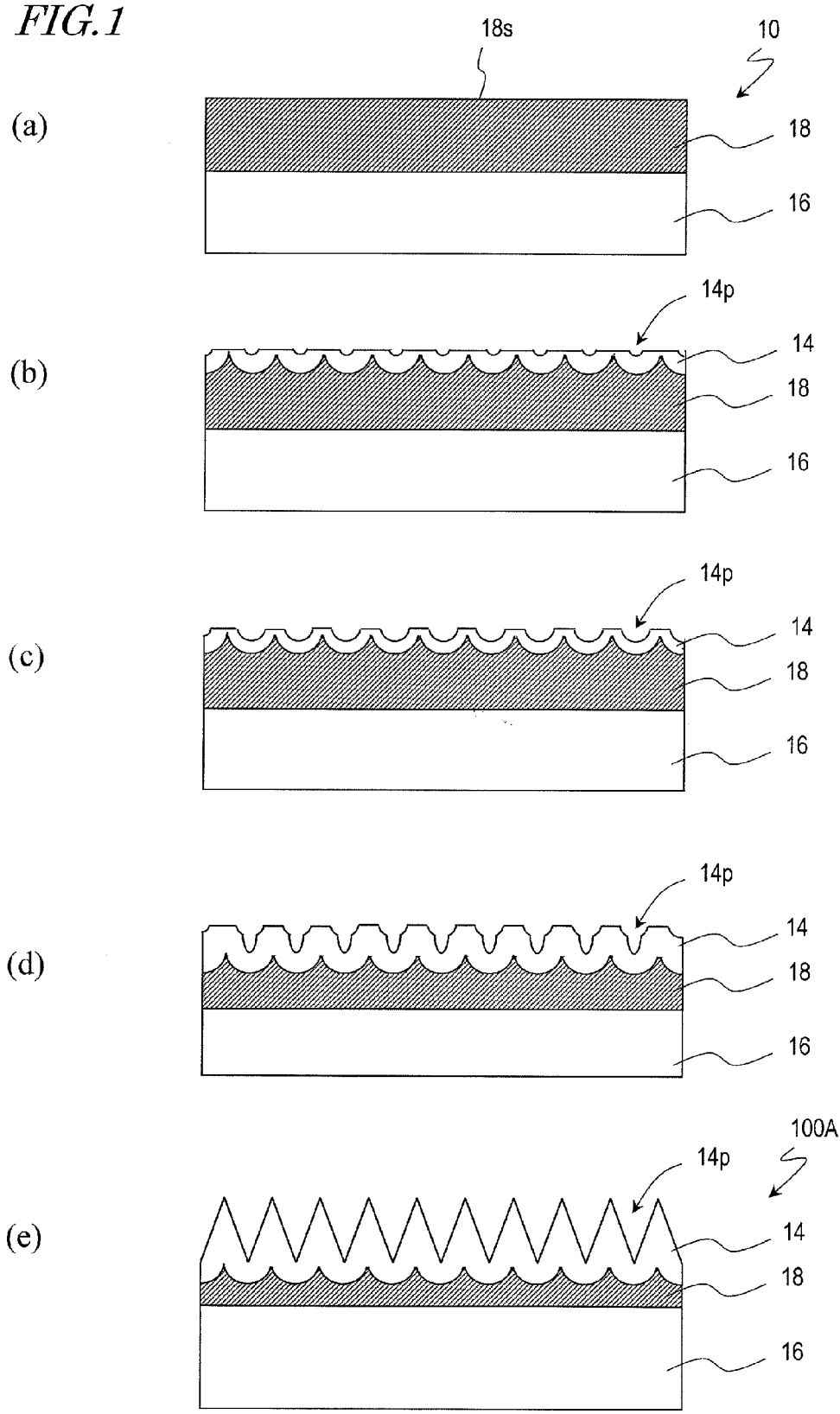
FIGS. 1(a) to (e) are schematic cross-sectional views for illustrating a method of fabricating a moth-eye mold 100A of an embodiment of the present invention.

Hereinafter, a moth-eye mold and a method of fabricating the moth-eye mold according to an embodiment of the present invention will be described with reference to the drawings. However, the present invention is not limited to the embodiment which will be illustrated below. Note that an example of an aluminum base which is described herein is realized by forming an aluminum film on a substrate (for example, glass substrate) using a thin film deposition technique, although the aluminum base may be a bulk of an aluminum material.

The mold fabrication method of the embodiment of the present invention includes, as shown in FIGS. 1(b) to 1(d), the step of anodizing a surface of an aluminum base 10 (a surface 18s of an aluminum film 18), thereby forming a porous alumina layer 14 which has a plurality of minute recessed portions 14p (FIG. 1(b)), the step of bringing the porous alumina layer 14 into contact with an etching solution, thereby enlarging the plurality of minute recessed portions 14p of the porous alumina layer 14 (FIG. 1(c)), and the step of further anodizing the surface, thereby growing the plurality of minute recessed portions 14p (FIG. 1(d)). One of the features of the mold fabrication method of the embodiment of the present invention resides in that the applied voltage of the second anodization cycle is greater than the applied voltage of the first anodization cycle. The mold fabrication method of the embodiment of the present invention enables fabrication of a mold that has an inverted moth-eye structure in its surface, in which the inverted moth-eye structure has a plurality of recessed portions whose two-dimensional size viewed in a direction normal to the surface is not less than 50 nm and less than 500 nm. Hereinafter, a moth-eye mold fabrication method of the embodiment of the present invention is described with reference to FIGS. 1(a) to 1(e).

Firstly, as shown in FIG. 1(a), an aluminum base 10 is provided which includes a glass substrate 16 and an aluminum film 18 deposited on the glass substrate 16. For example, the aluminum base 10 provided herein may be realized by forming a 1 μm thick aluminum film 18 on the glass substrate 16 using vacuum evaporation or sputtering.

Then, a surface of the base 10 (the surface 18s of the aluminum film 18) is anodized, whereby a porous alumina layer 14 which has a plurality of micropores 14p (minute recessed portions) is formed as shown in FIG. 1(b). The porous alumina layer 14 includes a porous layer which has the micropores 14p and a barrier layer. The porous alumina layer 14 may be formed by, for example, anodizing the surface 18s in an acidic electrolytic solution. The electrolytic solution used in the step of forming the porous alumina layer 14 may be an aqueous solution which contains, for example, an acid selected from the group consisting of oxalic acid, tartaric acid, phosphoric acid, chromic acid, citric acid, and malic acid. For example, as in Inventive Example 1 which will be described later, the surface 18s of the aluminum film 18 is anodized with an applied voltage of 80 V for 25 seconds using an oxalic acid aqueous solution (concentration 0.6 wt %, solution temperature 5° C.), whereby the porous alumina layer 14 is formed.

Then, the porous alumina layer 14 is brought into contact with an alumina etchant such that a predetermined amount is etched away, whereby the pore diameter of the micropores 14$p$ is increased as shown in FIG. 1($c$). Here, wet etching may be employed such that the pore wall and the barrier layer can be generally isotropically etched. By modifying the type and concentration of the etching solution and the etching duration, the etching amount (i.e., the size and depth of the micropores 14$p$) can be controlled. The etching solution used may be, for example, an aqueous solution of 10 mass % phosphoric acid or organic acid, such as formic acid, acetic acid, citric acid, or the like, or a chromium-phosphoric acid mixture solution. For example, as in Inventive Example 1 which will be described later, the etching is performed for 25 minutes using phosphoric acid (1 mol/L(liter), 30° C.).

Then, the aluminum film 18 is again partially anodized such that the micropores 14$p$ are grown in the depth direction and the thickness of the porous alumina layer 14 is increased as shown in FIG. 1($d$). The applied voltage of the second cycle of the anodization step is higher than the applied voltage of the first cycle of the anodization step. For example, as in Inventive Example 1 which will be described later, in the second cycle of the anodization step, the anodization is performed with an applied voltage of 90 V, which is higher than that applied in the first cycle of the anodization step (80 V), using an oxalic acid aqueous solution (concentration 0.6 wt %, solution temperature 5° C.) for 18 seconds, whereby the micropores 14$p$ are grown. By making the applied voltage higher in the second cycle of the anodization step than in the first cycle of the anodization step, as will be described later, it is possible to reduce the probability that a structure in which a plurality of tiny pores are formed in the inner surfaces of the micropores formed in the first cycle of the anodization step (hereinafter, also referred to as "a micropore in which a plurality of tiny pores are formed) is formed in the second cycle of the anodization step. The second cycle of the anodization step may be performed in the same electrolytic solution as that used in the first cycle of the anodization step.

Thereafter, when necessary, the porous alumina layer 14 may be further brought into contact with an alumina etchant to be further etched such that the pore diameter of the micropores 14$p$ is further increased. The etching solution used in this step may preferably be the above-described etching solution. Practically, the same etching solution may be used.

In this way, by repeating the anodization step and the etching step which have been described above, a moth-eye mold 100A which includes the porous alumina layer 14 that has a desired uneven shape is obtained as shown in FIG. 1($e$). Note that, in order to manufacture an antireflection film which provides an excellent antireflection performance, the two-dimensional size of the micropores 14$p$ when viewed in a direction normal to the surface is preferably not less than 10 nm and less than 500 nm (see Patent Documents 1, 2, and 4), more preferably not less than 50 nm and less than 500 nm.

The present inventors repeated the anodization and the etching to fabricate moth-eye mold samples. In some of the fabricated samples, it was found that, in the second cycle of the anodization step, a plurality of tiny pores were formed in micropores formed in the first anodization cycle. According to the moth-eye mold fabrication method of the embodiment of the present invention, the applied voltage of the second anodization cycle is greater than the applied voltage of the first anodization cycle, such that the number of micropores in which a plurality of tiny pores are formed can be reduced. This aspect is described in detail below.

In the beginning, referring to FIG. 2, a prior art moth-eye mold fabrication method will be described in which the applied voltage of the first cycle of the anodization step and the applied voltage of the second cycle of the anodization step are equal to each other. Also, it will be explained that there were many micropores in which a plurality of tiny pores were formed under the condition that the applied voltages of the first and second cycles of the anodization step were equal to each other.

Figure 2:
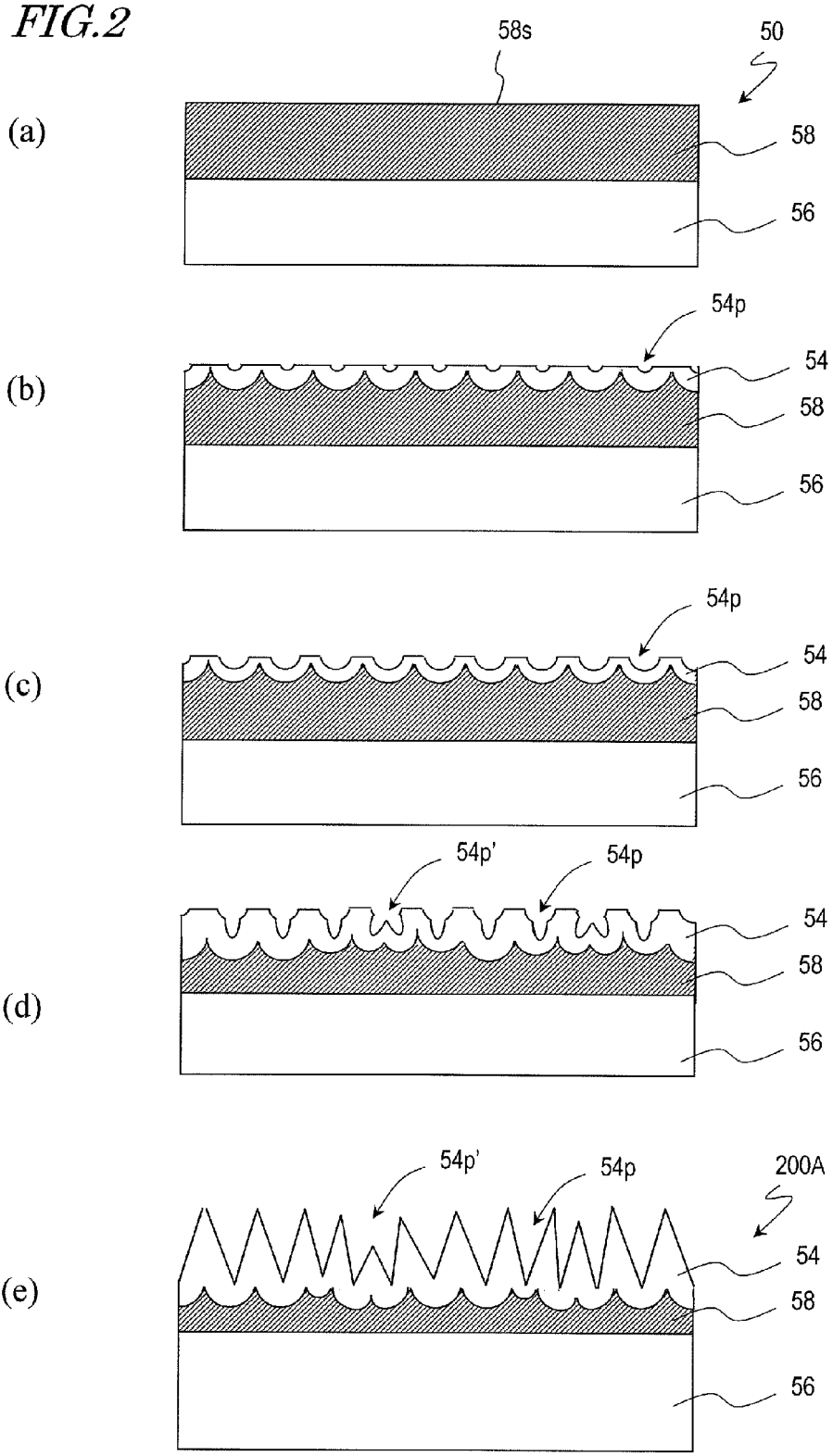
FIGS. 2(a) to (e) are schematic cross-sectional views for illustrating a method of fabricating a moth-eye mold 200A of a comparative example.

Firstly, as shown in FIG. 2($a$), an aluminum base 50 is provided which includes a glass substrate 56 and an aluminum film 58 deposited on the glass substrate 56.

Then, a surface of the base 50 (the surface 58$s$ of the aluminum film 58) is anodized, whereby a porous alumina layer 54 which has a plurality of micropores 54$p$ is formed as shown in FIG. 2($b$). For example, as in Comparative Example 1 which will be described later, the surface 58$s$ of the aluminum film 58 is anodized with an applied voltage of 80 V using an oxalic acid aqueous solution (concentration 0.6 wt %, solution temperature 5° C.), whereby the porous alumina layer 54 is formed.

Then, the porous alumina layer 54 is etched, whereby the pore diameter of the micropores 54$p$ is increased as shown in FIG. 2($c$).

Then, the aluminum film 58 is again partially anodized such that the micropores 54$p$ are grown in the depth direction and the thickness of the porous alumina layer 54 is increased as shown in FIG. 2($d$). The voltage applied in the second cycle of the anodization step is equal to the voltage applied in the first cycle of the anodization step. For example, as in Comparative Example 1 which will be described later, in the second cycle of the anodization step, the applied voltage is 80 V, which is equal to that applied in the first cycle of the anodization step.

Thereafter, the etching step and the anodization step are repeated, whereby a moth-eye mold 200A shown in FIG. 2($e$) is obtained.

The present inventors fabricated moth-eye mold samples under the condition that the applied voltage of the first cycle of the anodization step and the applied voltage of the second cycle of the anodization step were equal to each other. In some of the fabricated samples, a plurality of tiny pores were formed in the inner surfaces of some of the micropores that were formed in the first cycle of the anodization step (FIG. 2($b$)), as schematically shown by a micropore 54$p$' in FIG. 2($d$). The cause of occurrence of such a micropore in which a plurality of tiny pores were formed can probably be explained below. Note that, in the explanation provided below, the structure of the micropore 54$p$' is referred to as "a structure in which tiny pores were formed in one micropore" or "a micropore in which a plurality of tiny pores were formed".

In the beginning, a mechanism through which a porous alumina layer is formed by anodization with a constant applied voltage is described. In general, the mechanism through which a porous alumina layer is formed by anodization with a constant applied voltage is explained with the following four separate modes I to IV.

Mode I: In the early phase of the anodization, a thin barrier layer is formed on the aluminum surface. If the aluminum surface is smooth, a smooth, thin barrier layer is formed uniformly. The total electric current density monotonically decreases.

Mode II: In the process through which the thickness of the barrier layer increases, an uneven structure is formed in the surface due to volume expansion of the barrier layer. If the uneven structure is formed in the surface, the distribution of the intensity of an electric field applied to the barrier layer accordingly becomes nonuniform (at the same time, the distribution of the electric current density also becomes nonuniform). As a result, local dissolution occurs.

Mode III: In the recessed portions in which the electric field concentrates, the dissolving power of the electrolytic solution increases due to the electric field and/or a local temperature increase. so that micropores are formed. The bottom of the micropore has the shape of a bowl, so that the area of an interface at which dissolution occurs increases. As a result, the total electric current density increases.

Mode IV: Growth of some of the micropores stops, while the other micropores continue to grow. The number of micropores becomes constant, and the growth stably continues. The total electric current density decreases again. At this timing, the thickness of the barrier layer would not change. The thickness of the barrier layer depends on the applied voltage in the anodization.

It is known that the magnitude of the interpore distance in a porous alumina layer which is obtained as a result of a stable micropore growing process depends on the magnitude of the applied voltage.

The reason why a plurality of tiny pores were readily formed in the micropores is, as will be described later, that the etching was performed after the first anodization cycle so that the thickness of the barrier layer was decreased and the bottoms of the micropores were enlarged.

It is inferred that performing the etching step decreased the thickness of the barrier layer so that, in the micropores, the anodization newly advanced from Mode II, and therefore, the tiny pores were newly formed. It is estimated that, in the first anodization cycle, the process reached Mode III or Mode IV. However, it is inferred that, due to the decreased thickness of the barrier layer, in the second anodization cycle, the structure is similar to what it was before Mode III. As a result, it is inferred that, in the second anodization cycle, the process from Mode II to Mode III or the process from Mode II to Mode IV newly advanced in the micropores so that tiny pores were newly formed.

It is also inferred that performing the etching step enlarged the bottoms of the micropores so that aforementioned new tiny pores were readily formed in multiple portions. When the bottoms of the micropores are enlarged by the etching, the curvature of the bottoms decreases. It is therefore inferred that the region where a relatively high electric field is applied increases as compared with a case where the etching is not performed. In this case, it is inferred that, for example, when the bottoms of the micropores had tiny uneven structures, the uneven structures made the electric field distribution nonuniform, so that the electric field concentrated at multiple portions, and local dissolution occurred at the multiple portions.

The reason why a plurality of tiny pores were readily formed in the micropores formed in the first anodization cycle under the condition that the applied voltage is equal in the first and second cycles of the anodization may be as follows. Formation of a plurality of tiny pores in the micropores formed in the first anodization cycle requires that the pores should be formed with a smaller interval than the interpore distance of the porous alumina layer formed in the first anodization cycle. Here, it is inferred that, in the anodization, the voltage which is actually applied to the surface of the aluminum base (effective voltage) has a nonuniform distribution. The nonuniform distribution of the effective voltage is inferred to be attributed to, for example, a local concentration distribution of the electrolytic solution. It is inferred that, since the micropores are readily formed with a smaller interval as the effective voltage decreases, in a portion of the surface of the aluminum base in which the effective voltage was relatively low in the second anodization cycle, new tiny pores were readily formed with a smaller interval in the micropores formed in the first anodization cycle.

It is inferred that, since the etching was performed, new tiny pores were readily formed in the aforementioned portions in which the effective voltage was relatively low. Advancement of the second anodization cycle requires that the second anodization cycle should be performed under the conditions that lead to formation of a barrier layer whose thickness is greater than the thickness of the barrier layer that has previously been formed at the bottoms of the micropores. If the second anodization cycle is performed under the conditions that lead to formation of a barrier layer whose thickness is smaller than the thickness of the barrier layer that has previously been formed at the bottoms of the micropores, a sufficient current would not be supplied to the aluminum base, so that the anodization would not advance. In general, an approximately proportional relationship exists between the interpore distance and the thickness of the barrier layer, and therefore, formation of new tiny pores requires that the anodization should advance such that a thin barrier layer is formed. As described above, in the process of fabricating a moth-eye mold, the etching is performed after the first anodization cycle, so that the thickness of the barrier layer decreases. Thus, it is inferred that, even in a portion of a relatively low voltage, the anodization which entailed formation of tiny pores readily advanced.

In the fabrication method of the embodiment of the present invention, the applied voltage of the second cycle is increased, whereby the probability of formation of a plurality of tiny pores in the micropores is reduced. It is inferred that the above-described micropores in which a plurality of tiny pores were formed resulted from formation of tiny pores with a small interval in the micropores formed in the first anodization cycle. As described above, the magnitude of the interpore distance in a porous alumina layer which is obtained as a result of a stable micropore growing process depends on the magnitude of the applied voltage. If the applied voltage is large, a porous alumina layer with a large interpore distance is formed. By increasing the applied voltage in the second anodization cycle, the probability of formation of tiny pores with a small interval is reduced, and accordingly, the probability of formation of a plurality of tiny pores in the micropores formed in the first anodization cycle is reduced.

By increasing the applied voltage of the second anodization cycle, the effective voltage is increased in the above-described portions where the voltage is relatively low and new tiny pores are readily formed. This may be another reason that the probability of formation of a plurality of tiny pores in the micropores in the second anodization cycle decreases.

The present inventors fabricated an antireflection film using a mold that had a relatively large number of micropores in which a plurality of tiny pores were formed, such as the moth-eye mold 200A (FIG. 2(e)), and encountered a problem that the probability of the sticking phenomenon, i.e., a phenomenon that a plurality of protrusions (also referred to as "a plurality of raised portions") at a surface of a work to which the moth-eye structure has been transferred stick together into bunches, increases as will be described later. Since the moth-eye mold 100A (FIG. 1(e)) that is fabricated using the fabrication method of the embodiment of the present invention has a smaller number of micropores in which a plurality of tiny pores are formed than the moth-eye mold 200A, an antireflection film fabricated with the use of the moth-eye mold 100A is advantageous in that the number density of sites at which the sticking phenomenon occurs can be decreased, as compared with a case where the moth-eye mold 200A is used.

The moth-eye mold fabrication method of the embodiment of the present invention can also be used for fabrication of a moth-eye mold which has a desired aspect ratio. By decreasing the aspect ratio, the probability of occurrence of the above-described sticking defects can be reduced. Here, the aspect ratio of the moth-eye mold refers to the ratio of the depth to the two-dimensional size (diameter) of the micropores. Note that the aspect ratio of the micropores may be modified by altering the duration of the anodization to adjust the depth of the micropores. An experiment carried out for examining the relationship between the aspect ratio and the sticking density will be described later in detail.

Now, the number density of the micropores in which a plurality of tiny pores are formed is described. The number density of the micropores in which a plurality of tiny pores are formed may be altered by, for example, modifying the difference between the applied voltage of the first anodization cycle and the applied voltage of the second anodization cycle. For example, as illustrated in Inventive Examples 1 and 2 which will be described later, the number density of the micropores in which a plurality of tiny pores were formed was smaller in Inventive Example 2 where the applied voltage for the first cycle was 80 V and the applied voltage for the second cycle was 100 V (the number density of the micropores in which a plurality of tiny pores were formed: 0.81) than in Inventive Example 1 where the applied voltage for the first cycle was 80 V and the applied voltage for the second cycle was 90 V (the number density of the micropores in which a plurality of tiny pores were formed: 2.44). In Inventive Examples 1 and 2, the applied voltage of the second anodization cycle was greater than the applied voltage of the first anodization cycle, so that the number density of the minute recessed portions of the porous alumina layer which was counted after the second cycle of the anodization step (the number density of all the minute recessed portions, including the micropores and the tiny pores formed in the micropores) was less than 1.26 times the number density of the minute recessed portions which was counted after the first anodization cycle.

The difference between the applied voltage of the first anodization cycle and the applied voltage of the second anodization cycle is preferably not less than ⅛, more preferably not less than ¼, of the applied voltage of the first anodization cycle. Note that if the applied voltage of the second anodization cycle is at least slightly greater than the applied voltage of the first anodization cycle, the number density of the micropores in which a plurality of tiny pores are formed can be reduced.

In general, when the applied voltage of the anodization is relatively large (e.g., about 150 V), breakage of the aluminum film may occur. Thus, the applied voltage of the second anodization cycle is preferably increased so as not to exceed 150 V.

Now, the growth rate in the depth direction of the porous alumina layer in the respective steps is described. From the viewpoint of controllability, the growth rate in the depth direction of the porous alumina layer in the first cycle of the anodization step is preferably not more than 35 nm/sec. According to an examination conducted by the present inventors, when the growth rate of the porous alumina layer was higher than 35 nm/sec, uniform anodization of the entire surface of the aluminum base sometimes failed. From the viewpoint of productivity, the growth rate in the depth direction of the porous alumina layer in the first cycle of the anodization step is preferably not less than 0.5 nm/sec. For the same reason, the growth rate in the depth direction of the porous alumina layer in the second cycle of the anodization step is preferably not less than 0.5 nm/sec and not more than 35 nm/sec. Note that, in general, the growth rate in the depth direction of the porous alumina layer may vary depending on, for example, the type of the electrolytic solution, the concentration of the electrolytic solution, and the applied voltage. If the type and the concentration of the electrolytic solution are the same, the growth rate of the porous alumina layer increases as the applied voltage increases. If the applied voltage is constant, the growth rate increases as the concentration of the electrolytic solution increases. As described above, in the moth-eye mold fabrication method of the embodiment of the present invention, the first anodization cycle and the second anodization cycle may be performed in the same electrolytic solution. Here, in the fabrication method of the embodiment of the present invention, the applied voltage of the second cycle of the anodization step is greater than the applied voltage of the first cycle of the anodization step, so that the growth rate in the depth direction of the porous alumina layer in the second cycle of the anodization step is higher than the growth rate in the depth direction of the porous alumina layer in the first cycle of the anodization step. Note that, in the anodization of Inventive Examples 1 and 2 and Comparative Example 1 which will be described later, the growth rate of the porous alumina layer was 3.6 to 9.0 nm/sec.

Now, a preferred range of the porosity of the porous alumina layer is described. In the moth-eye mold 100A (FIG. 1(e)), the porosity is preferably not less than 75% and not more than 95%. To achieve a porosity of not less than 75% and not more than 95% in the moth-eye mold 100A, in the case where the moth-eye mold 100A is fabricated by, for example, alternately performing the anodization step and the etching step through 5 cycles (including 5 anodization cycles and 4 etching cycles) as in Inventive Examples 1 and 2 which will be described later, it is preferred that the porosity increases by not less than 16% and not more than 28% in every cycle of the etching step. Note that, in this specification, the porosity of the porous alumina layer refers to the area ratio of the openings of the micropores in the unit area in the plane of the openings. In calculation of the porosity, the openings of the micropores were approximated to circles. Specifically, the radii of the micropores were measured from a SEM image of the surface of the porous alumina layer, and the areas of the circles were calculated from the measured radii for determining the porosity.

In the fabrication method of the embodiment of the present invention, in the case where the interpore distance (the interval between the centers of the micropores) is increased (e.g., to 180 nm or more), it is preferred that a barrier-type alumna layer is formed before the above-described first cycle of the anodization step. A method of forming a barrier-type alumina layer and experiment examples of formation of the barrier-type alumina layer will be described later.

Hereinafter, the anodized layer formation method of the embodiment of the present invention is described in more detail with reference to inventive examples and comparative examples.

Inventive Examples 1 and 2, Comparative Example 1

The moth-eye molds of Inventive Examples 1 and 2 have the same configuration as that of the moth-eye mold 100A shown in FIG. 1(e). The fabrication process which has previously been described with reference to FIGS. 1(a) to 1(e) was performed as described below. Note that the differences between Inventive Examples 1 and 2 were the applied voltage and the duration of the second and subsequent cycles.

The base 10 (FIG. 1(a)) used herein was prepared by forming a 1 μm thick aluminum film 18 by sputtering on a square glass substrate 16 (0.7 mm thick) of 5 cm on each side. Note that the aluminum film 18 was formed by performing 5 cycles of the step of depositing a 200 nm thick aluminum layer.

The anodization step and the etching step were alternately performed on the base 10 through 5 cycles (including 5 anodization cycles and 4 etching cycles), whereby the moth-eye mold 100A was fabricated. In each of Inventive Examples 1 and 2, the first cycle of the anodization step was performed with an applied voltage of 80 V for 25 seconds using an oxalic acid aqueous solution (concentration 0.6 wt %, solution temperature 5° C.). The second and subsequent cycles of the anodization step were performed using the same electrolytic solution as that used in the first cycle of the anodization step, with an applied voltage of 90V for 18 seconds in Inventive Example 1, and with an applied voltage of 100 V for 10 seconds in Inventive Example 2. The etching step was performed for 25 minutes using a phosphoric acid aqueous solution (concentration 1 mol/L, solution temperature 30° C.).

Comparative Example 1 is different from Inventive Examples 1 and 2 in that all the cycles of the anodization step were performed with the same applied voltage. Each of the 5 cycles of the anodization step was performed with an applied voltage of 80 V for 25 seconds using an oxalic acid aqueous solution (concentration 0.6 wt %, solution temperature 5° C.). The etching step was performed under the same etching conditions as those of Inventive Examples 1 and 2.

In Inventive Examples 1 and 2 and Comparative Example 1, the durations of the second and subsequent anodization cycles were adjusted such that the depth of the micropores of the porous alumina layer was generally equal (about 200 nm) among the molds of Inventive Examples 1 and 2 and Comparative Example 1.

Figure 3:
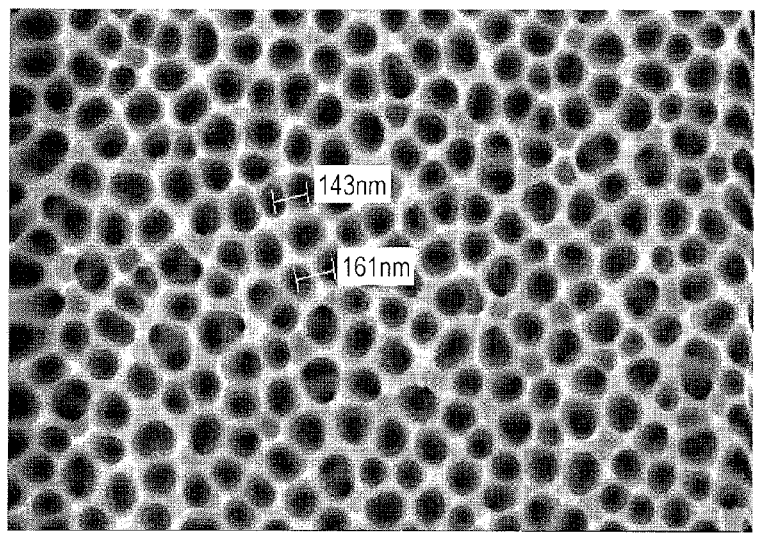
FIGS. 3(a), (b), and (c) show SEM images of the surfaces of moth-eye molds of Inventive Example 1, Inventive Example 2, and Comparative Example 1.
Figure 3:
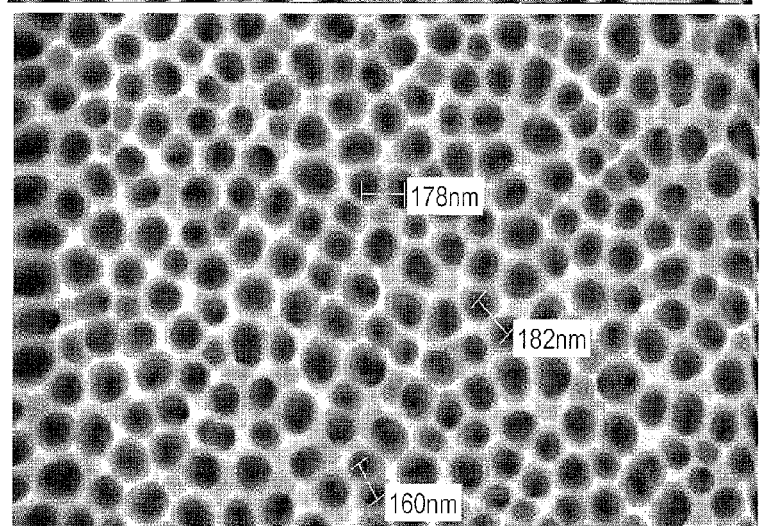
Figure 3:
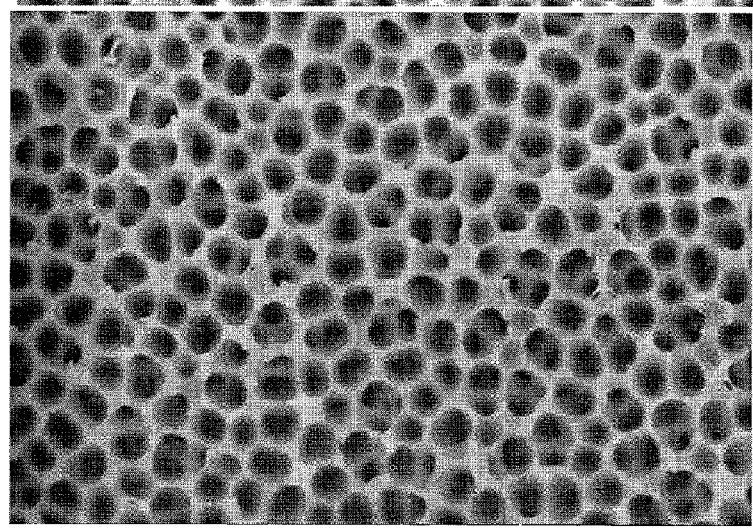

SEM images of the surfaces of the moth-eye molds of Inventive Examples 1 and 2 and Comparative Example 1 are shown in FIGS. 3(a), 3(b), and 3(c), respectively. As seen from FIGS. 3(a) to 3(c), in each of Inventive Examples 1 and 2 and Comparative Example 1, a moth-eye mold obtained had a plurality of generally-conical micropores formed over its entire surface. As seen from FIG. 3(c), the porous alumina layer of the moth-eye mold of Comparative Example 1 had a large number of micropores in each of which about two or three tiny pores were formed. As seen from the comparison of FIG. 3(c) with FIGS. 3(a) and 3(b), a larger number of such micropores in which a plurality of tiny pores were formed were observed in the moth-eye mold of Comparative Example 1 than in the moth-eye molds of Inventive Examples 1 and 2.

The number and the number density of the micropores in which a plurality of tiny pores were formed, calculated for the region shown in FIGS. 3(a) to 3(c) (3 μm×2 μm (=6 μm$^2$)), are shown in Table 1.

TABLE 1

|  | Inventive Example 1 | Inventive Example 2 | Comparative Example 1 |
| --- | --- | --- | --- |
| Applied voltage in first anodization cycle (V) | 80 | 80 | 80 |
| Duration of first anodization cycle (sec) | 25 | 25 | 25 |
| Growth rate of porous alumina layer in first anodization cycle (nm/sec) | 3.6 | 3.6 | 3.6 |
| Applied voltage in second and subsequent anodization cycles (V) | 90 | 100 | 80 |
| Duration of second and subsequent anodization cycles (sec) | 18 | 10 | 25 |
| Growth rate of porous alumina layer in second and subsequent anodization cycles (nm/sec) | 5.0 | 9.0 | 3.6 |
| Number of micropores in which a plurality of tiny pores were formed (counts) | 15 | 5 | 50 |
| Number density of micropores in which a plurality of tiny pores were formed (counts/μm$^2$) | 2.44 | 0.81 | 8.14 |

As seen from Table 1, in each of Inventive Examples 1 and 2, the number density of the micropores in which a plurality of tiny pores were formed was smaller than that of the moth-eye mold of Comparative Example 1. Thus, when the applied voltage of the second anodization cycle was greater than the applied voltage of the first anodization cycle, the number of the micropores in which a plurality of tiny pores were formed was reduced as compared with a case where the applied voltage was equal in the first and second anodization cycles. Comparing Inventive Example 1 and Inventive Example 2, the number density of the micropores in which a plurality of tiny pores were formed was smaller in Inventive Example 2 than in Inventive Example 1.

In other words, as the voltage of the second cycle was higher relative to the voltage of the first cycle, the number density of the micropores in which a plurality of tiny pores were formed decreased. This can be because of the following reasons. As previously described, in the anodization for formation of a porous alumina layer, as the applied voltage increases, the resultant porous alumina layer has a greater interpore distance. Formation of the tiny pores in the micropores formed in the first anodization cycle requires that the micropores should be formed with a smaller interval than the interpore distance of the first anodization cycle. Therefore, as the voltage of the second anodization cycle increases, the probability of formation of pores with a small interval decreases. This can be the reason that the number density of the micropores in which a plurality of tiny pores were formed decreased.

The reason why the number density of the micropores in which a plurality of tiny pores were formed was smaller in Inventive Example 2 can also be described as follows. As previously described, a voltage which is actually applied to the aluminum base in the anodization (effective voltage) has a nonuniform distribution. It is inferred that, in a portion where the effective voltage is relatively low, the probability of formation of a plurality of tiny pores in the micropores that are formed in the first anodization cycle increases. In Inventive Example 2, the applied voltage of the second anodization cycle was greater, so that the effective voltage in a portion in which a plurality of tiny pores could be newly formed (a portion in which the effective voltage was relatively low) was large as compared with Inventive Example 1. Thus, it is inferred that, the probability of formation of new tiny pores was decreased. As a result, it is inferred that, as compared with Inventive Example 1, the number of micropores in which a plurality of tiny pores could newly be formed was decreased.

In the moth-eye mold of Comparative Example 1, about 30 micropores per 1 μm$^2$ were formed in the first anodization cycle. The number density of the micropores in which a plurality of tiny pores were formed was 8.14 counts/$\mu m^2$. Therefore, the number density of the minute recessed portions of the porous alumina layer which was counted after the second cycle of the anodization step (the number density of all the minute recessed portions, including the micropores and the tiny pores formed in the micropores) was 1.26 times the number density of the minute recessed portions which was counted after the first anodization cycle. In Inventive Examples 1 and 2, the increase rate of the minute recessed portions in the second anodization cycle was 1.08 times and 1.03 times, respectively. In Inventive Examples 1 and 2, the applied voltage of the second anodization cycle was increased, so that the increase rate of the minute recessed portions in the second anodization cycle was less than 1.26 times.

As will be described later, the present inventors manufactured antireflection films using the moth-eye molds of Inventive Examples 1 and 2 and Comparative Example 1. In the antireflection films manufactured using the moth-eye molds of Inventive Examples 1 and 2, the sticking density (the number density of sites at which two or more raised portions were in contact with one another) was smaller than in the antireflection film manufactured using the moth-eye mold of Comparative Example 1.

Now, a method of manufacturing an antireflection film with the use of the moth-eye mold 100A that is fabricated according to the fabrication method of the embodiment of the present invention is described with reference to FIG. 4.

Figure 4:
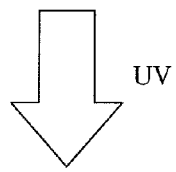
FIG. 4 A schematic cross-sectional view for illustrating the process of manufacturing an antireflection film with the use of the moth-eye mold 100A.
Figure 4:
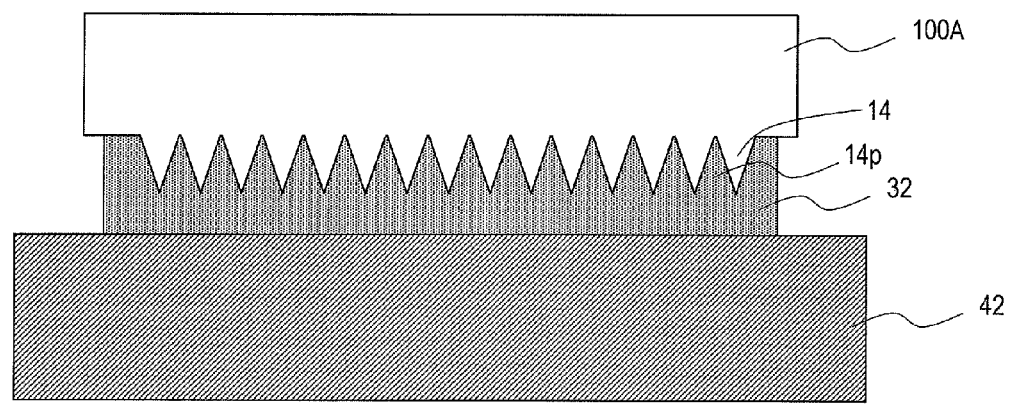

Firstly, as shown in FIG. 4, the moth-eye mold 100A is provided.

Then, a UV-curable resin 32, which is provided between a surface of a work 42 and a mold, is irradiated with ultraviolet (UV) light such that the UV-curable resin 32 is cured. The UV-curable resin 32 may be provided over the surface of the work 42 or may be provided over a mold surface of the mold (a surface of the mold which has the moth-eye structure). The UV-curable resin used may be, for example, an acrylic resin.

Thereafter, the moth-eye mold 100A is separated from the work 42, whereby a cured material layer of the UV-curable resin 32, to which the uneven structure of the moth-eye mold 100A is transferred, is formed over the surface of the work 42.

The raised portions of the moth-eye structure preferably have a base whose diameter is not less than 50 nm and not more than 500 nm. The raised portions are preferably arranged so as to have no periodicity for the purpose of preventing occurrence of unnecessary diffracted light. Here, "having no periodicity" means that, for example, the distance between the vertex of a certain one of a plurality of raised portions and the vertex of a raised portion which is closest to the vertex of the certain raised portion is different from the distance between the vertex of another certain one of the plurality of raised portions and the vertex of still another one of the raised portions which is closest to the vertex of the another certain raised portion. As for the meaning of "having no periodicity", for example, when the total sum of the vectors extending from the barycenter of a certain one of the micropores to the barycenters of all the micropores that are adjacent to the certain micropore is not less than 5% of the total length of the vectors, it can be said that the arrangement of the micropores has no periodicity.

The shape of the raised portions of the moth-eye structure is preferably conical. When the raised portions have a conical shape, the antireflection effect can be improved. Therefore, the shape of the micropores of the moth-eye mold is preferably conical. The two-dimensional size of the micropores of the porous alumina layer of the moth-eye mold 100A when viewed in a direction normal to the mold surface is generally equal to the interpore distance (the distance between the centers of the micropores). To manufacture an antireflection film which provides an excellent antireflection performance, the two-dimensional size and the interpore distance of the micropores are preferably not less than 50 nm and less than 500 nm. The shape and the size of the micropores can be changed by modifying, for example, the conditions and the number of cycles of the anodization and/or the conditions and the number of cycles of the etching.

The present inventors manufactured an antireflection film according to the same method as the above-described antireflection film manufacturing method, with the use of a moth-eye mold that was fabricated according to the prior art fabrication method in which the applied voltage of the first cycle of the anodization step and the applied voltage of the second cycle of the anodization step were equal to each other as in Comparative Example 1, and found the sticking phenomenon at a large number of sites such that a plurality of protrusions at the surface of the work stuck together into bunches. There was a problem that, when the sticking phenomenon occurred at a large number of sites, the color difference $\Delta E$ from the achromatic color became large as will be described later.

Figure 5:
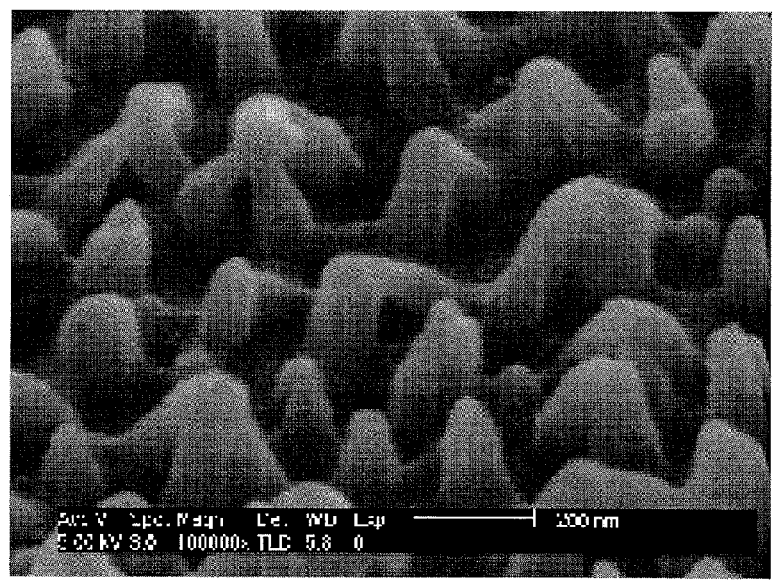
FIG. 5 A perspective view (SEM image) of part of a surface of an antireflection film in which sticking defects occurred.

FIG. 5 shows a perspective SEM image of a portion of the surface of the work in which sticking defects occurred. FIG. 5 shows part of the surface of an antireflection film 300C which will be described later. For convenience of description, the surface of the antireflection film 300C was rubbed with a wet cloth such that many sticking defects occurred. As seen from FIG. 5, at the surface of the work, a plurality of protrusions (two to five protrusions) were flexed so as to be in contact with one another. Note that, in the moth-eye structure of the surface of the antireflection film shown in FIG. 5, the average value of the diameter of the base was 180 nm, and the average value of the height was 200 nm.

If there are many portions in which a plurality of tiny pores are formed in one micropore as in the moth-eye mold 200A of Comparative Example 1, a plurality of protrusions at the surface of the work readily come into contact with one another. In a portion in which a plurality of tiny pores are formed in one micropore, the interval between adjacent pores (tiny pores) is small. Therefore, when this structure is transferred, the protrusions at the surface of the work readily come into contact with one another. In a micropore in which a plurality of tiny pores are formed (micropore 54p' shown in FIG. 2(d)), the plurality of tiny pores are formed vertical relative to the inner surface of the micropore. Therefore, the plurality of tiny pores are formed obliquely relative to the mold surface. A sticking defect occurs when protrusions are flexed (i.e., obliquely tilted) to come into contact with one another. Thus, it is inferred that protrusions formed by transferring obliquely-formed tiny pores can readily be the cause of a sticking defect.

As for the antireflection films that were manufactured with the use of the moth-eye molds of Inventive Examples 1 and 2 and Comparative Example 1 (hereinafter, referred to as antireflection films 110A, 110B, and 210A, respectively), the number (number density) of sticking defects and the scattered light intensity were examined, and the color of scattered light was evaluated from the wavelength dispersion of the scattered light intensity. The experimental results of the examination and the evaluation are described below.

The antireflection films 110A and 110B were manufactured using the moth-eye molds of Inventive Examples 1 and 2 (moth-eye mold 100A) according to the method which has previously been described with reference to FIG. 4. The work used was a TAC film. A UV-curable resin, which was provided between a surface of the TAC film and a mold, was irradiated with ultraviolet light (2 J/cm²), whereby the UV-curable resin was cured. The TAC film was placed over the mold using a roller such that air voids were not generated. Thereafter, the moth-eye mold was separated from the TAC film, whereby an antireflection film was obtained including, over the TAC film, a cured material layer of the UV-curable resin to which the uneven structure of the moth-eye mold was transferred.

Figure 6:
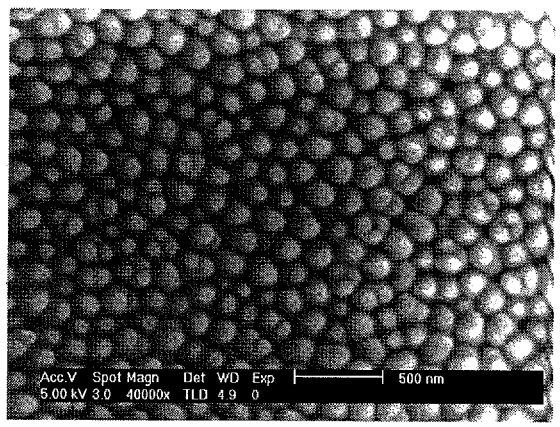
FIGS. 6(a), (b), and (c) show SEM images of surfaces of antireflection films 110A, 110B, and 210A, respectively.
Figure 6:
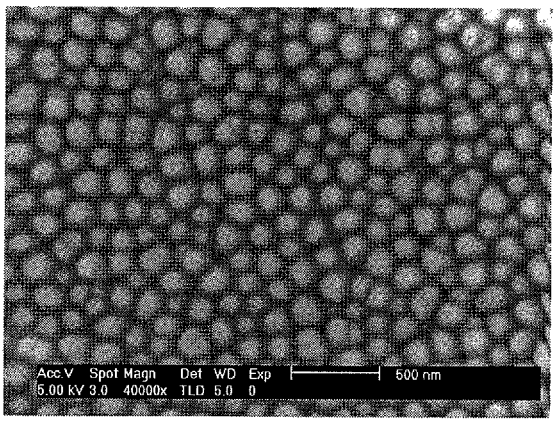
Figure 6:
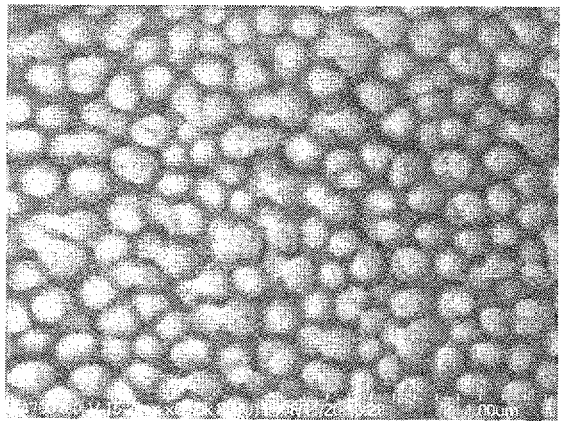

The SEM images of the surfaces of the antireflection films 110A and 110B are shown in FIGS. 6(a) and 6(b), respectively. The number and the density of sticking defects are shown in Table 2. From the SEM images of FIGS. 6(a) and 6(b), the number and the density of structures in which a plurality of protrusions were in contact with one another, which were herein defined as "sticking defects", were calculated. The number of sticking defects in the regions shown in FIGS. 6(a) and 6(b) was 6 and 1, respectively. The number density of sticking defects (the number density of sites at which two or more protrusions were in contact with one another) over the surface of the antireflection films 110A and 110B in the regions shown in FIGS. 6(a) and 6(b) (4 μm×5 μm (=20 μm²)), which was calculated from the number of sticking defects, was 0.3 and 0.05, respectively.

On the other hand, the antireflection film 210A was manufactured using the moth-eye mold of Comparative Example 1 (moth-eye mold 200A) according to the same method as that described above. The number and the density of sticking defects, which were calculated from the SEM image of the surface of the antireflection film 210x (FIG. 6(c)), were 22 and 1.1, respectively.

Thus, by using the moth-eye molds of Inventive Examples 1 and 2, occurrence of sticking defects was reduced as compared with Comparative Example 1. The sticking density of the antireflection film that was manufactured using the moth-eye mold of Inventive Example 2 was small as compared with Inventive Example 1. This is probably because the moth-eye mold of Inventive Example 2 had a smaller number of micropores in which a plurality of tiny pores were formed.

The present inventors examined the wavelength dependence of the intensity of light scattered by the antireflection films 110A, 11013, and 210A. The results of the examination are described below with reference to FIG. 7 and FIG. 8.

Figure 7:
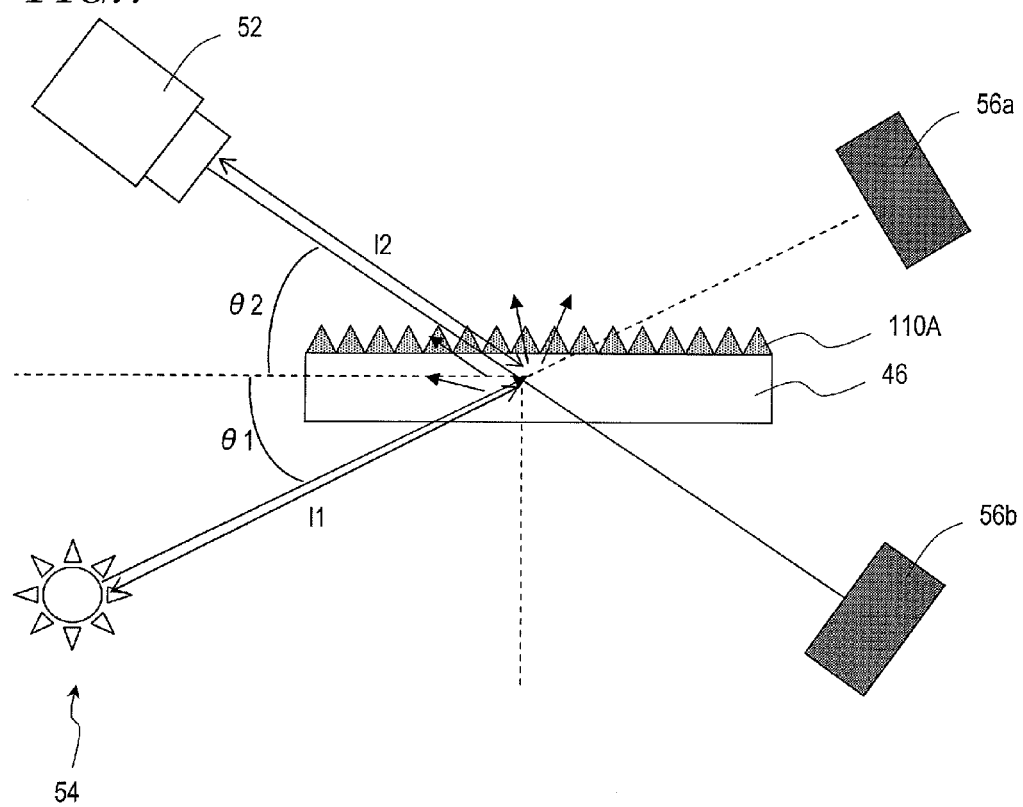
FIG. 7 A schematic diagram for illustrating a measurement system used for measuring the scattered light intensity of the antireflection film 110A.

FIG. 7 is a diagram schematically showing a measurement system for used for measuring the scattered light intensity of the antireflection film 110A. As shown in FIG. 7, the antireflection film 110A was secured to a transparent acrylic plate 46 and irradiated with light from a light source 54 that was installed with angle θ1 (here, 30°) relative to the rear surface of the transparent acrylic plate 46. The scattered light intensity was measured using a luminance meter 52 (spectroradiometer for ultra-low luminance (SR-UL1 manufactured by TOPCON Corporation)) that was installed with angle θ2 (here, 30°) relative to the surface of the transparent acrylic plate 46 (the scattered light rays are shown by arrows in FIG. 7). The light source 54 used was the standard illuminant $D_{65}$. Light absorbers 56a and 56b were provided opposite to the light source 54 and the luminance meter 52, respectively, with the transparent acrylic plate 46 interposed therebetween. Note that the reason why θ1 and θ2 were 30° is to remove a specular reflection component. The reason why the light absorbers 56a and 56b were provided opposite to the light source 54 and the luminance meter 52, respectively, is to remove stray light. The luminance of the light source 54 was 3 cd/m². The distance between the light source 54 and the antireflection film 110A (l1 in FIG. 7) was 15 cm. The distance between the luminance meter 52 and the antireflection film 110A (l2 in FIG. 7) was 40 cm. The measurement angle of the luminance meter 52 was 2°. The measurement wavelength range was from 380 nm to 780 nm.

Figure 8:
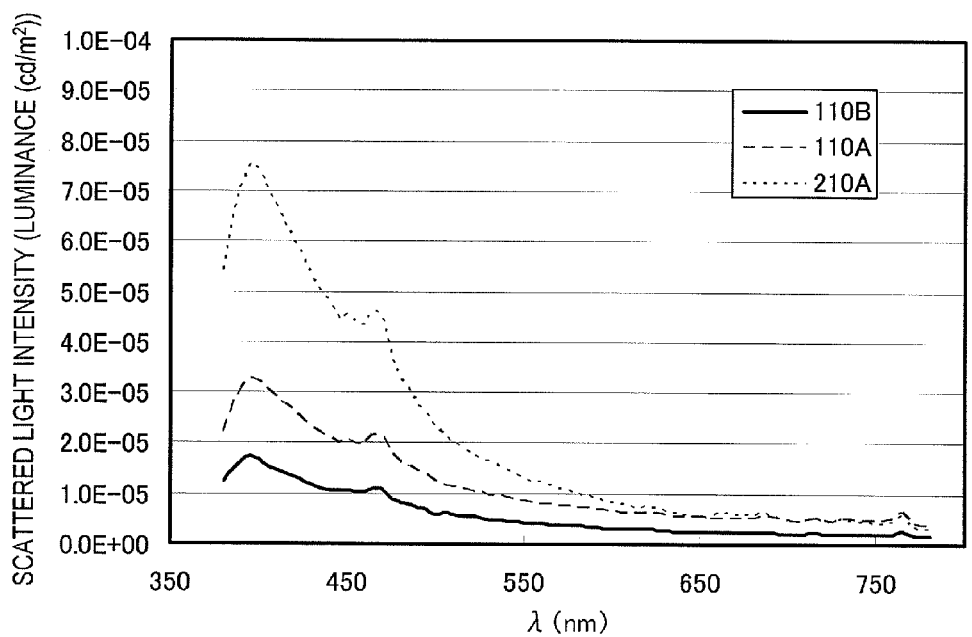
FIG. 8 A graph which shows the wavelength dependence of the scattered light intensity of the antireflection films 110A, 110B, and 210A.
Figure 9:
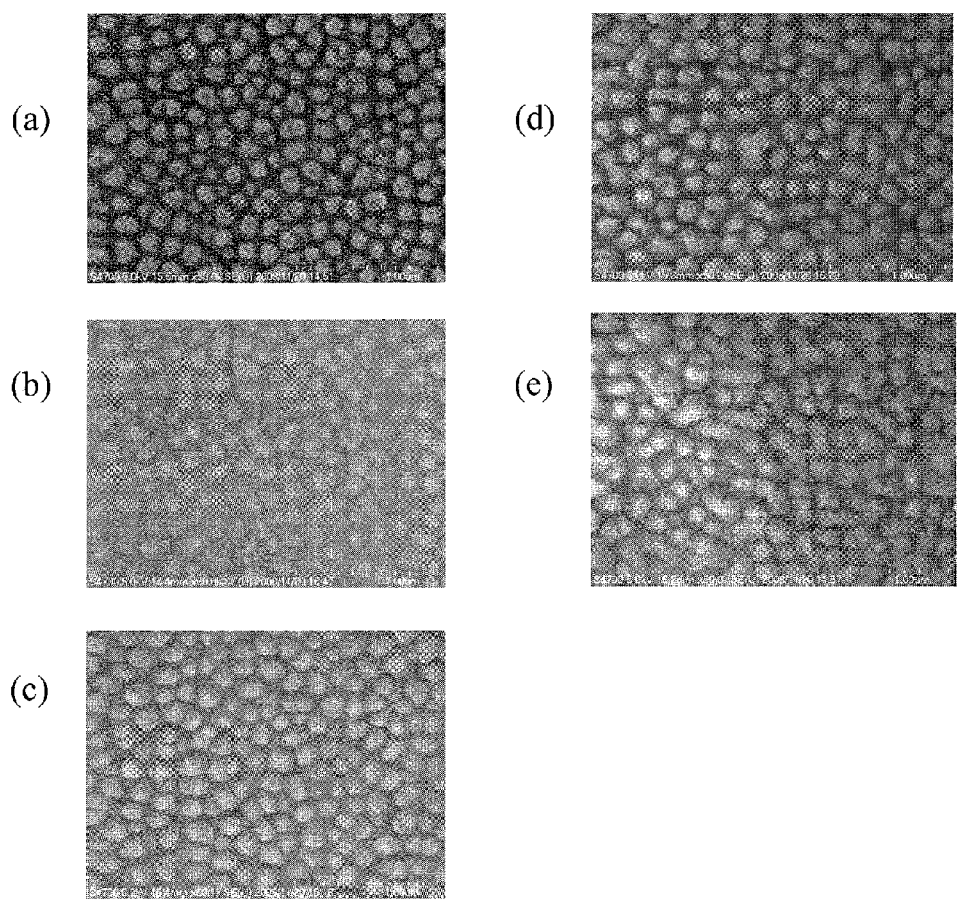
FIGS. 9(a), (b), (c), (d), and (e) show SEM images of surfaces of antireflection films 300A, 300B, 300C, 300D, and 300E, respectively.

FIG. 8 is a graph which shows the wavelength dependence of the scattered light intensity (luminance (cd/m²)) of the antireflection films 110A, 110B, and 210A. In FIG. 8, the broken line, the bold line, and the dotted line correspond to the antireflection films 110A, 110B, and 210A, respectively. As seen from FIG. 8, over the entire wavelength range, the scattered light intensity decrementally varied in order of the antireflection films 210A, 110A, and 110B. This is probably attributed to the fact that the sticking density decrementally varied in this order.

Also, the color of scattered light was evaluated from the wavelength dependence of the scattered light intensity. The tristimulus values XYZ were calculated using the wavelength dispersion of the scattered light intensity with the $D_{65}$ light source and the CIE 1931 color matching function, and a* and b* in the L*a*b* color space were obtained. $(a^{*2}+b^{*2})^{1/2}$ represents the color difference ΔE from the achromatic color.

The color differences ΔE obtained for the antireflection films 110A, 110B, and 210A are shown in Table 2. The antireflection films preferably have a small color difference from the achromatic color. Particularly, the color difference is preferably not more than 3.0. This is because, if an antireflection film which has a large color difference from the achromatic color is used in a display device, the antireflection film would deteriorate the color reproducibility of the display panel. In general, if the color difference between two compared objects is greater than 3.0, the two objects are recognized as having different colors. Therefore, an antireflection film whose color difference from the achromatic color is greater than 3.0 is not preferred because the color difference is so large that the difference in color is perceived when compared with the achromatic color. In each of the antireflection films 110A, 110B, and 210A, the color difference ΔE from the achromatic color was not more than 3.0.

TABLE 2

|  | 110A | 110B | 210A |
| --- | --- | --- | --- |
| Number of sticking defects (counts) | 6 | 1 | 22 |
| Number density of sticking defects (counts/μm²) | 0.3 | 0.05 | 1.1 |
| Color difference ΔE | 1.33 | 1.09 | 2.31 |

As previously described, the moth-eye mold fabrication method of the embodiment of the present invention is also applicable to fabrication of a moth-eye mold which has a desired aspect ratio. There is an advantage in that, by decreasing the aspect ratio, occurrence of sticking defects can be prevented as will be described below. As previously described, a sticking defect is caused when adjacent raised portions at the surface of the work are flexed to come into contact with one another. By decreasing the aspect ratio of the raised portions that are formed by transfer with the use of a moth-eye mold (the ratio of the height of the raised portions to the two-dimensional size (diameter) of the base of the raised portions), the flexibility of the raised portions is decreased, so that occurrence of sticking defects can be reduced. The aspect ratio of the raised portions can be decreased by decreasing the aspect ratio of the micropores of the porous alumina layer of the mold (the ratio of the depth of the micropores to the two-dimensional size (diameter) of the micropores).

The present inventors examined the relationship between the aspect ratio and the sticking density and the relationship between the sticking density and the color difference. The experimental results of the examination are described below. In the experiments, 5 types of molds were fabricated among which the aspect ratio of the micropores was different, and 5 types of antireflection films were manufactured. As for the obtained 5 types of antireflection films, the sticking density and the scattered light intensity were examined. Also, the color difference from the achromatic color, which can be estimated from the scattered light intensity, was examined. The aspect ratio of the micropores can be changed by altering the anodization duration. This is because the micropores grow in the depth direction in each cycle of the anodization step. In the experiments, the anodization duration was varied to fabricate types of molds which have different aspect ratios. Although the sticking density can be reduced by making the applied voltage of the second and subsequent anodization cycles greater than that of the first anodization cycle such that the number of micropores in which a plurality of tiny pores are formed is reduced as previously described, the experiments which will be described below were carried out using the same applied voltage in all the anodization cycles for the sake of simplicity.

Hereinafter, 5 types of antireflection films which were manufactured using 5 types of molds that were fabricated with 5 different anodization durations are referred to as antireflection films 300A, 300B, 300C, 300D, and 300E. Table 3 shows the anodization duration and the micropore depth of the moth-eye molds used for manufacture of the antireflection films 300A, 300B, 300C, 300D, and 300E. Table 3 also shows the height of the transferred structures (the height of the protrusions) of the antireflection films 300A, 300B, 300C, 300D, and 300E. Note that all of the values of the micropore depth and the height of the transferred structures shown in Table 3 are average values.

The 5 types of molds were fabricated by alternately performing the anodization and the etching through 5 cycles (including 5 anodization cycles and 4 etching cycles) on a base which was prepared by forming a 1 μm thick aluminum film by sputtering on a square glass substrate of 10 cm on each side (0.7 cm thick). The anodization step was performed using an oxalic acid aqueous solution (concentration 0.6 wt %, solution temperature 5° C.), with an applied voltage of 80 V, with 5 different durations ranging from 15 to 38 seconds as shown in Table 3. The etching step was performed using a phosphoric acid aqueous solution (concentration 1.0 mol/L, solution temperature 30° C.) for 25 minutes. As a result, the 5 types of moth-eye molds with micropores that have a two-dimensional size of about 180 nm and different depths were obtained. Note that the two-dimensional size of the micropores (the diameter of the micropores) is equal among the 5 types of molds. Therefore, the aspect ratio (the ratio of the depth to the diameter) of the micropores was greater as the depth of the micropores increased.

The thus-obtained 5 types of molds were used to manufacture 5 types of antireflection films 300A to 300E according to the method which has previously been described with reference to FIG. 4. The work used was a TAC film. A UV-curable resin, which was provided between a surface of the TAC film and the mold, was irradiated with ultraviolet light (2 J/cm$^2$), whereby the UV-curable resin was cured. The TAC film was placed over the mold using a roller such that air voids were not generated. Thereafter, the moth-eye mold was separated from the TAC film, whereby an antireflection film was obtained including, over the TAC film, a cured material layer of the UV-curable resin to which the uneven structure of the moth-eye mold was transferred. To secure the TAC film, the resultant antireflection film was adhered to a transparent acrylic plate. Note that, as described above, in each of the molds, the two-dimensional size of the micropores was about 180 nm, and accordingly, in each of the resultant 5 types of antireflection films, the two-dimensional size of the protrusions over the surface was about 180 nm. Thus, in the 5 types of antireflection films, the aspect ratio of the protrusions over the surface was larger as the height of the protrusions increased.

SEM images of the surfaces of the resultant antireflection films 300A, 300B, 300C, 300D, and 300E are shown in FIGS. 9(a) to 9(e). From the SEM images shown in FIG. 9 (2 μm×2.5 μm (=5 μm$^2$)), the number and the number density of sticking defects (sites at which a plurality of raised portions were in contact with one another) in the region of FIG. 9 were calculated. The results are shown in Table 3. For example, at the center of FIG. 9(d), a structure in which three protrusions are in contact with one another can be observed. The sticking defects typically have such a structure. The number and the density of such structures, which were herein defined as "sticking defects", were calculated from the SEM images of FIG. 9. No sticking defect was found in the antireflection film 300A. The two-dimensional size of sticking defects detected in the antireflection films 300B, 300C, 300D, and 300E was about 300 nm to 600 nm.

As seen from Table 3, as the micropore depth of the moth-eye mold increased, the height of the transferred structures of the resultant antireflection film increased. In other words, as the aspect ratio of the micropores of the moth-eye mold increased, the aspect ratio of the transferred structures also increased. Also, as the aspect ratio of the micropores and the aspect ratio of the transferred structures increased, the number density of sticking defects increased.

TABLE 3

|  | 300A | 300B | 300C | 300D | 300E |
|---|---|---|---|---|---|
| Anodization duration (sec) | 15 | 20 | 24 | 33 | 38 |
| Micropore depth (nm) | 231 | 328 | 387 | 520 | 600 |
| Micropore aspect ratio | 1.28 | 1.82 | 2.15 | 2.89 | 3.33 |
| Transferred structure height (nm) | 143 | 175 | 219 | 255 | 373 |
| Protrusion aspect ratio | 0.79 | 0.97 | 1.21 | 1.42 | 2.07 |
| Number of sticking defects (counts) | 0 | 1 | 1 | 6 | 19 |
| Number density of sticking defects (counts/μm$^2$) | 0.0 | 0.2 | 0.2 | 1.3 | 4.0 |
| Color difference ΔE | 1.12 | 1.39 | 1.35 | 2.3 | 3.04 |

The scattered light intensity of the antireflection films 300A, 300B, 300C, 300D, and 300E was examined using a luminance meter according to the same method as that previously described with reference to FIG. 7.

Figure 10:
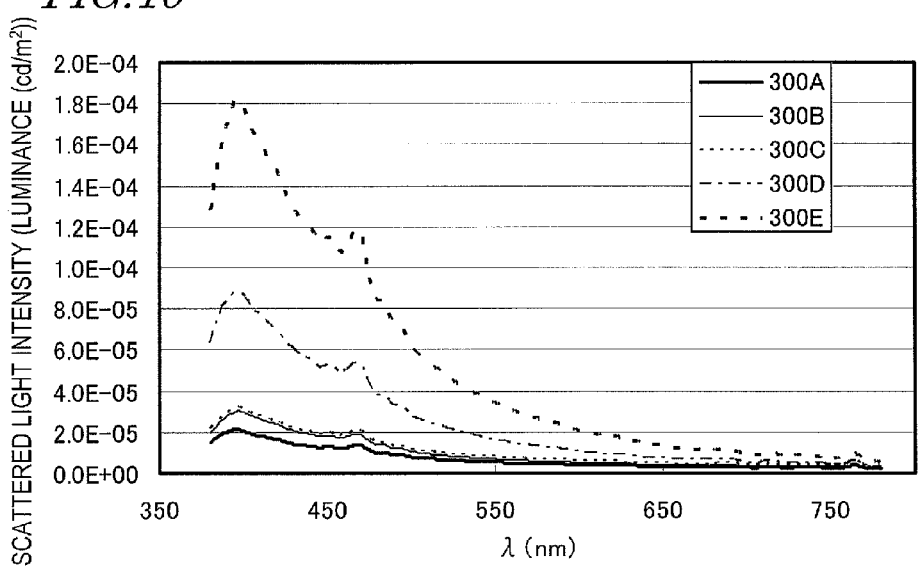
FIG. 10 A graph which shows the wavelength dependence of the scattered light intensity of the antireflection films 300A, 300B, 300C, 300D, and 300E.

FIG. 10 shows the wavelength dependence of the scattered light intensity of the antireflection films 300A, 300B, 300C, 300D, and 300E by the bold solid line, the thin solid line, the dotted line, the chain line, and the bold dotted line, respectively. As seen from FIG. 10, over the entire wavelength range, the scattered light intensity incrementally varied in order of the antireflection films 300A, 300B, 300C, 300D, and 300E.

The color of scattered light was also evaluated according to the same method as that used for Table 2. Specifically, a* and b* in the L*a*b* color space were obtained from the wavelength dispersion of the scattered light intensity. $(a^{*2}+b^{*2})^{1/2}$ represents the color difference ΔE from the achromatic color. The color differences ΔE obtained for the antireflection films 300A, 300B, 300C, 300D, and 300E are shown in Table 3. The color difference ΔE from the achromatic color incrementally varied in order of the antireflection films 300A, 300C, 300B, 300D, and 300E. In other words, generally speaking, the color difference from the achromatic color was larger as the sticking density increased.

As previously described, the color difference from the achromatic color is preferably not more than 3.0 because the deterioration of the color reproducibility is prevented even when the antireflection film is used in a display device. As seen from Table 3, only in the antireflection film 300E, the color difference from the achromatic color was greater than 3.0. As seen from Table 3, in the antireflection film 300D, the sticking density was 1.3, and the color difference from the achromatic color was 2.3. Therefore, it is appreciated that the sticking density is preferably not more than 1.3 from the viewpoint of color reproducibility because the color difference from the achromatic color can be limited to 3.0 or less.

Now, a preferred range of the aspect ratio of the micropores and the protrusions is described.

As seen from the results of Table 3, it is preferred that the aspect ratio of the protrusions is not more than 1.42 (antireflection film 300D) because the sticking density can be limited to 1.3 or less, and thus, the color difference from the achromatic color can be limited to 3.0 or less. As previously described, in the moth-eye mold fabrication method of the embodiment of the present invention, a moth-eye mold which has micropores of a desired aspect ratio can be fabricated by modifying the anodization duration, for example.

In order that the fabricated antireflection film may provide a sufficient antireflection performance, the aspect ratio of the micropores is preferably not less than 0.5. The raised portions of the surface of an antireflection film manufactured with the use of a moth-eye mold in which the aspect ratio of the micropores is less than 0.5 would cause a steep change in refractive index along the depth direction for incoming light, so that a sufficient antireflection performance would not be provided. Also, from the viewpoint of mass production, the aspect ratio of the micropores is preferably not more than 6.0.

As previously described, from the viewpoint of manufacturing an antireflection film which provides an excellent antireflection performance, the shape of the micropores of the moth-eye mold is preferably conical. The two-dimensional size of the micropores when viewed in a direction normal to the mold surface and the interpore distance are preferably not less than 50 nm and less than 500 nm.

As previously described, a moth-eye mold wherein the number density of the micropores in which a plurality of tiny pores are formed is small can be fabricated using the moth-eye mold fabrication method of the embodiment of the present invention which has been described with reference to FIGS. 1(a) to 1(e) such that the applied voltage of the second anodization cycle is greater than the applied voltage of the first anodization cycle. In the moth-eye mold fabrication method of the embodiment of the present invention, furthermore, for example, the anodization duration may be modified so as to fabricate a moth-eye mold wherein the aspect ratio of the micropores is small, and the number density of the micropores in which a plurality of tiny pores are formed is small. By using a moth-eye mold wherein the aspect ratio of the micropores is small and the number density of the micropores in which a plurality of tiny pores are formed is small, an antireflection film with a further decreased sticking density can be manufactured.

As previously described, in order to increase the interpore distance of the porous alumina layer (e.g., not less than 180 nm), it is preferred to form a barrier-type alumina layer prior to the first cycle of the above-described anodization step in the moth-eye mold fabrication process of the present invention. Particularly, in the case where the anodization is performed using a deposited aluminum film, in order to increase the interpore distance, it is preferred to form a barrier-type alumina layer. By forming a barrier-type alumina layer beforehand, a porous alumina layer which has a desired interpore distance can be formed.

The present inventors disclosed in International Application No. PCT/JP2010/64798 a method of forming a porous alumina layer after a barrier-type alumina layer has been formed beforehand. The entire disclosures of International Application No. PCT/JP2010/64798 are incorporated by reference in this specification.

Figure 11:
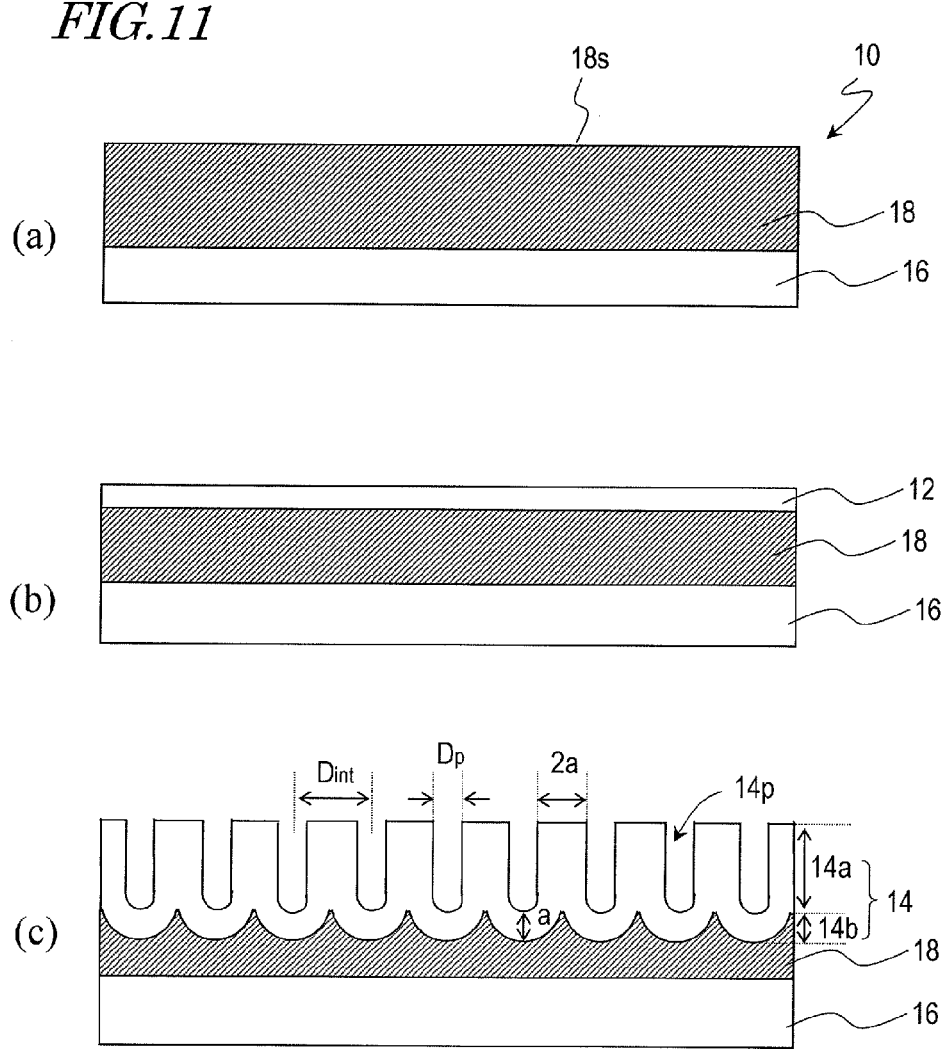
FIGS. 11(a) to (c) are schematic cross-sectional views for illustrating a method of forming a porous alumina layer after a barrier-type alumina layer has been formed beforehand.

Hereinafter, a method of forming a porous alumina layer after a barrier-type alumina layer has been formed beforehand is described with reference to FIG. 11. FIGS. 11(a) to 11(c) are schematic cross-sectional views for illustrating a method of forming a porous alumina layer after a barrier-type alumina layer has been formed beforehand. In an example described herein, an aluminum film formed over a substrate (e.g., glass substrate) using a thin film deposition technique is used. However, the anodized layer formation method which is described below is also applicable to a bulk of an aluminum material.

As shown in FIGS. 11(a) to 11(c), the method includes the step of providing a base 10 which has a surface made of aluminum (here, a base 10 which includes a substrate 16 and an aluminum film 18 deposited on the substrate 16; FIG. 11(a)), the step of anodizing the surface (here, the surface 18s of the aluminum film 18) to form a barrier-type alumina layer 12 (FIG. 11(b)), and thereafter, the step of further anodizing the surface 18s to form a porous alumina layer 14 which has a plurality of minute recessed portions 14p (FIG. 11(c)).

It is known that the magnitude of the interpore distance in a porous alumina layer which is obtained as a result of a stable micropore growing process depends on the magnitude of the applied voltage. In that case, the interpore distance $D_{int}$ is expressed by the sum of the entire thickness of the pore walls, 2a, and the pore diameter, $D_p$ (see FIG. 11(c)). Note that the thickness of the pore wall is equal to the thickness of the barrier layer, a, and therefore, the entire thickness of the pore wall that intervenes between two micropores is represented by the entire thickness, 2a.) Note that $D_p$ is smaller than 2a, and therefore, it is approximately estimated that $D_{int}=2a$.

However, in the porous alumina layer prepared by the present inventors which was formed by anodizing an aluminum film deposited by sputtering, the interpore distance $D_{int}$ and the applied voltage did not satisfy the above-described relationship in some cases. Specifically, the interpore distance $D_{int}$ was not proportional to the applied voltage and did not exceed a predetermined value, although the thickness of the barrier layer was proportional to the applied voltage. When oxalic acid was used as the electrolytic solution as in experimental examples which will be described later, the surface of the aluminum film was anodized under the conditions from which formation of a porous alumina layer with an interpore distance of not less than 200 nm was expected in view of the above-described relationship, but the resultant interpore distance did not exceed about 180 nm to 190 nm. The aluminum film deposited on the substrate was an aggregate of crystal grains. The average grain diameter of the crystal grains was approximately 180 nm to 190 nm.

It was found that the interpore distance of the porous alumina layer obtained by anodizing the surface of the aluminum film as described above is restricted by the diameter of the crystal grains that form the aluminum film. The reasons for this are described below.

The grain boundaries in the aluminum film form recessed portions at the film surface. Therefore, a surface of the barrier layer formed in Mode I and Mode II which have previously been described also has recessed portions at the positions corresponding to the grain boundaries. As a result of concentration of the electric field, micropores grow preferentially at the positions corresponding to the grain boundaries. Thereafter, even if the anodization advances, preferential dissolution continues to advance in the micropores formed at the positions corresponding to the grain boundaries.

Specifically, when a flat surface of aluminum is anodized, the barrier layer grows till it has recessed portions which can cause concentration of the electric field such that local dissolution occurs, before the process transitions to Mode III. On the other hand, however, when an aluminum film which has grain boundaries is anodized, concentration of the electric field occurs in recessed portions that are attributed to the grain boundaries, and the process transitions to Mode III. Therefore, the thickness of the barrier layer in transition to Mode III is smaller in the case of the aluminum film with grain boundaries than in the case of an aluminum material with a flat surface.

The interpore distance which is restricted by the grain boundaries may vary depending on the type of the electrolytic solution. As a result of experiments, when oxalic acid was used, the interpore distance was generally corresponding to the average grain diameter. When tartaric acid was used, however, the interpore distance was restricted to a value which was generally twice the average grain diameter. This is because the power to dissolve alumina varies depending on the type of the electrolytic solution.

The present inventors acquired the knowledge that, by forming a barrier-type alumina layer 12 prior to the anodization that is performed for the purpose of forming the porous alumina layer on the surface of the aluminum film, the interpore distance is prevented from being restricted by the diameter of crystal grains that form the aluminum film, and reached the concept of a method of forming an anodized layer which will be described below. Hereinafter, a method of forming an anodized layer according to an embodiment of the present invention is described with reference to FIGS. 11(a) to 11(c).

Firstly, as shown in FIG. 11(a), an aluminum base 10 which includes an aluminum film 18 deposited on a glass substrate 16, for example, is provided. The aluminum film 18 is formed by means of vacuum evaporation or sputtering, for example. The thickness of the aluminum film 18 is, for example, 1 µm. The average grain diameter of crystal grains that form the aluminum film 18 may be approximately 180 nm to 190 nm.

Then, as shown in FIG. 11(b), the surface of the base 10 (the surface 18s of the aluminum film 18) is anodized, whereby a barrier-type alumina layer 12 is formed. The electrolytic solution used may be, for example, a neutral electrolytic solution (with pH of more than 3.0 and less than 8.0). The neutral electrolytic solution may preferably be an aqueous solution containing at least one of the acids or salts selected from the group consisting of ammonium tartrate, potassium sodium tartrate, boric acid, ammonium borate, ammonium oxalate, ammonium citrate, maleic acid, malonic acid, phthalic acid, and citric acid. For example, the anodization is performed with the applied voltage of 80 V for 2 minutes using an aqueous solution of pH 6.5 which is at the solution temperature of 23.0° C. and which contains ammonium tartrate at the concentration of 0.1 mol/L, whereby a barrier-type alumina layer 12 with a thickness of about 100 nm can be formed. The thickness of the barrier-type alumina layer 12 may be altered by modifying the magnitude of the applied voltage.

The thickness of the barrier-type alumina layer 12 may be appropriately determined according to an intended interpore distance as will be described later with experimental examples. By forming the barrier-type alumina layer, the interpore distance of the porous alumina layer that is formed after the formation of the barrier-type alumina layer is prevented from being restricted by the crystal grain diameter. Also, by modifying the thickness of the barrier-type alumina layer 12, the interpore distance of the porous alumina layer can be adjusted.

Then, as shown in FIG. 11(c), the aluminum film 18 is further anodized, whereby a porous alumina layer 14 which has a plurality of micropores 14p is formed. The electrolytic solution may be an aqueous solution which contains, for example, an acid selected from the group consisting of oxalic acid, tartaric acid, phosphoric acid, chromic acid, citric acid, and malic acid. The type of the electrolytic solution and the applied voltage affect the interpore distance of the porous alumina layer.

In the example illustrated in FIG. 11(c), for the sake of easy understanding, $D_{int}=T_w=2a$ holds true, where a is the thickness of the barrier layer, $D_{int}$ is the interpore distance (average adjoining distance), and $T_w$ is the thickness of the pore wall. As will be described later in the inventive examples, in a porous alumina layer which is obtained according to the anodized layer formation method of the present invention, $D_{Int}=2a$ does not necessarily hold true.

For example, after the formation of the above-described barrier-type alumina layer 12 that has a thickness of about 100 nm, the anodization is performed with an applied pulse voltage (amplitude 150 V, pulse width 10 msec, pulse interval 1 sec) for 2 minutes using an oxalic acid aqueous solution (concentration 0.6 wt %, solution temperature 5° C.), whereby a porous alumina layer 14 whose average interpose distance is 216.5 nm is obtained. Note that the thickness of the porous alumina layer may be appropriately changed. The aluminum film 18 may be entirely anodized.

Now, the function and the effects of the barrier-type alumina layer are described. The description provided below is a consideration based on the facts that were experimentally confirmed by the present inventors, which is provided for aid in understanding the present invention and to which the present invention is not limited.

The barrier-type alumina layer is formed over the surface of the aluminum film (the surfaces of the respective crystal grains) so as to have a generally uniform thickness.

Thereafter, the anodization is performed under the conditions determined for formation of a porous alumina layer. The conditions employed in this step are such that the thickness a of a barrier layer 14b included in a porous alumina layer 14 which is to be formed in this step is greater than the thickness of the barrier-type alumina layer which has already been formed. If the conditions employed in this step were such that the thickness a of the barrier layer 14b included in the porous alumina layer 14 which is to be formed in this step is smaller than the thickness of the barrier-type alumina layer which has already been formed, the anodization would not advance. This is because the electric current is not sufficiently supplied to the aluminum film.

As understood from the above, the interpore distance of the porous alumina layer that is formed after the formation of the barrier-type alumina layer is greater than the interpore distance of a porous alumina layer which includes a barrier layer whose thickness is equal to that of the barrier-type alumina layer. Furthermore, since the interpore distance of the porous alumina layer is proportional to the applied voltage, the interpore distance increases as the applied voltage increases.

Here, the aluminum film was anodized under such conditions that a porous alumina layer may be formed without formation of the barrier-type alumina layer. The applied voltage was increased so as to exceed a predetermined value, but the interpore distance of the formed porous alumina layer was restricted by the crystal grain diameter. This is because, in Mode II which has previously been described, the electric field concentrates in recessed portions of the barrier layer which are formed at the positions corresponding to the grain boundaries.

On the other hand, in the above-described anodized layer formation method, at the timing of performing the anodization for formation of the porous alumina layer, a barrier-type alumina layer has already been formed to a predetermined thickness or greater. Therefore, it is inferred that the degree of concentration of the electric field in the recessed portions of the barrier-type alumina layer which are formed at the positions corresponding to the grain boundaries of the aluminum film is smaller than the degree of concentration of the electric field in the recessed portions of the barrier layer in Mode II in the case where a porous alumina layer is directly formed over the surface of the aluminum film (in the barrier-type alumina layer, the recessed portions have a smaller curvature and a greater thickness), and the processes of Mode III and Mode IV advance through a mechanism which satisfies the proportional relationship between the applied voltage and the interpore distance. Note that, even when a barrier-type alumina layer is formed beforehand, the electric field concentrates in recessed portions in the process of forming a porous alumina layer, and therefore, micropores are readily formed at the positions corresponding to the grain boundaries. The interpore distance increases depending on the thickness of the barrier-type alumina layer which has been formed beforehand.

According to the anodized layer formation method which has been described with reference to FIG. 11, the porous alumina layer is formed after the barrier-type alumina layer has been formed. Therefore, the interpore distance of the porous alumina layer can be controlled without being restricted by the crystal grain diameter of the aluminum film. The interpore distance of the porous alumina layer can also be controlled not only by modifying the magnitude of the applied voltage in formation of the porous alumina layer but also by regulating the thickness of the barrier-type alumina layer that is formed beforehand. In other words, the above-described relationship between the interpore distance of an anodized layer that is to be finally obtained by the anodized layer formation method which has been described with reference to FIG. 11 (i.e., porous alumina layer) and the voltage which is applied in the step of forming the porous alumina layer does not hold true in general. Also, the above-described relationship between the interpore distance and the thickness of the barrier layer (note that the barrier-type alumina layer that is formed beforehand is included in the barrier layer of the porous alumina layer that is to be finally obtained) does not hold true in general.

The present inventors examined the interpore distance in the case where the porous alumina layer was formed after the formation of the barrier-type alumina layer. The experimental results of the examination are shown below.

Firstly, the experimental results of the examination as to the interpore distance of 9 types of porous alumina layers are shown, which were fabricated by performing the anodization with the use of an ammonium tartrate aqueous solution to form a barrier-type alumina layer and thereafter performing the anodization with the use of an oxalic acid aqueous solution. Hereinafter, the 9 types of porous alumina layers are referred to as the porous alumina layers 90A, 90B, 90C, 90D, 90E, 90F, 90G, 90H, and 90I.

Each of the porous alumina layers 90A, 90B, 90C, 90D, 90E, 90F, 90G, 90H, and 90I was formed by performing the anodization with the use of an ammonium tartrate aqueous solution to form a barrier-type alumina layer and thereafter performing the anodization with the use of an oxalic acid aqueous solution. In the processes of forming the porous alumina layers 90A, 90B, 90C, 90D, 90E, 90F, 90G, 90H, and 90I, the voltage applied in the anodization for formation of the barrier-type alumina layer, the voltage applied in the anodization for formation of the porous alumina layer, and the duration of the voltage application in the anodization for formation of the porous alumina layer were different (the magnitude of the applied voltage is shown in Table 4), while the other conditions (the aluminum base used, the electrolytic solution used in each cycle of the anodization) were the same.

The base 10 (FIG. 11(a)) used was prepared by forming a 1 μm thick aluminum film 18 by sputtering on a square glass substrate 16 of 5 cm on each side (0.7 mm thick). Note that the aluminum film 18 was formed by performing 5 cycles of the step of depositing a 200 nm thick aluminum layer. At the surface of the aluminum film 18, there were crystal grains whose size was about 180 nm to 190 nm.

In the anodization for formation of the barrier-type alumina layer, the surface 18s of the base 10 was anodized for 2 minutes with the use of ammonium tartrate (concentration 0.1 mol/L, pH 6.5, solution temperature 23.0° C.), whereby the barrier-type alumina layer 12 was formed. The applied voltage was any of 80 V, 100 V, 120 V, 150 V, and 180V shown in Table 4, which was applied according to a direct current anodizing method.

In the anodization for formation of the porous alumina layer, the anodization was performed with the use of oxalic acid (pH 6.5, concentration 0.6 wt %, solution temperature 5° C.), whereby the porous alumina layer 14 was formed. The applied voltage was a pulse voltage such that the amplitude was any of 150 V, 200 V, and 300 V shown in Table 4, the pulse width t was 10 msec, and the pulse interval T was 1 sec. The reason why the pulse voltage was applied is to prevent occurrence of breakage of the aluminum film. The anodization was continued till aluminum completely changed into alumina. The anodization duration for formation of the porous alumina layer was in the range of 1 min to 30 min.

SEM images of the surfaces of the porous alumina layers 90A, 90B, 90C, 90D, 90E, 90F, 90G, 90H, and 90I were obtained and, for all the micropores in the region of 3 μm×2.3 μm (=6.9 μm²), the distances from each of the micropores to the first to third closest micropores (interpore distances) were measured. The average values of the interpore distance calculated from the measured interpore distances are shown in Table 4. Table 4 also shows the thickness of the first-formed barrier-type alumina layer and the thickness of the barrier layer of the porous alumina layer which was formed in the subsequent anodization.

TABLE 4

|  | 90A | 90B | 90C | 90D | 90E | 90F | 90G | 90H | 90I |
|---|---|---|---|---|---|---|---|---|---|
| Applied voltage of anodization for formation of barrier-type alumina layer (V) | 80 | 100 | 80 | 100 | 120 | 100 | 120 | 150 | 180 |
| Anodization duration for formation of barrier-type alumina layer (sec) | 120 | 120 | 120 | 120 | 120 | 120 | 120 | 120 | 120 |
| Amplitude of applied voltage of anodization for formation of barrier-type alumina layer (V) | 150 | 150 | 200 | 200 | 200 | 300 | 300 | 300 | 300 |
| Thickness of barrier-type alumina layer (nm) | 104 | 142 | 104 | 142 | 157 | 142 | 157 | 203 | 230 |
| Thickness of barrier layer (nm) | 165 | 158 | 208 | 211 | 216 | 313 | 308 | 318 | 310 |
| Average value of interpore distances (nm) | 216.5 | 240.3 | 238.4 | 246.2 | 271.7 | 253.0 | 259.4 | 296.5 | 337.0 |

The present inventors also examined the interpore distance of porous alumina layers which were formed without formation of the barrier-type alumina layer. The porous alumina layers were formed by anodizing the surface of the same aluminum base as that described above, under the conditions that the applied voltage was a pulse voltage with amplitudes of 200 V and 300 V, pulse width of 10 msec, and pulse interval of 1 sec, with the use of oxalic acid (concentration 0.6 wt %, solution temperature 5° C.), till aluminum completely changed into alumina. The formed porous alumina layers are referred to as porous alumina layers 290A and 290B. The average values of the interpore distance are shown in Table 5, which were obtained in the same way as those shown in Table 4.

TABLE 5

|  | 290A | 290B |
|---|---|---|
| Amplitude of applied voltage of anodization (V) | 200 | 300 |
| Anodization duration (sec) | 16 | 5 |
| Thickness of barrier layer (nm) | 211 | 313 |
| Average value of interpore distances (nm) | 190.2 | 187.8 |

In each of the porous alumina layers 90A, 90B, 90C, 90D, 90E, 90F, 90G, 90H, and 90I, the average value of the interpore distance was not less than 200 nm (Table 4), whereas the average values of the interpore distance of the porous alumina layers 290A and 290B (Table 5) were 190.2 nm and 187.8 nm, respectively. Thus, in the porous alumina layers 90A, 90B, 90C, 90D, 90E, 90F, 90G, 90H, and 90I, the interpore distance was large as compared with the porous alumina layers 290A and 290B.

In other words, the interpore distance of the porous alumina layers 290A and 290B was restricted by the grain diameter of the crystal grains that formed the aluminum film (180 nm to 190 nm), whereas in the cases of the porous alumina layers 90A, 90B, 90C, 90D, 90E, 90F, 90G, 90H, and 90I, the barrier-type alumina layer was formed, which is the reason that the interpore distance was not restricted by the grain diameter of the crystal grains that formed the aluminum film. As the applied voltage of the anodization for formation of the porous alumina layer increased, the resultant porous alumina layer had a greater interpore distance.

Comparing the porous alumina layers 90C, 90D, and 90E among which the applied voltage of the anodization for formation of the porous alumina layer is equal, as the applied voltage of the anodization for formation of the barrier-type alumina layer increased, i.e., as the thickness of the formed barrier-type alumina layer increased, the interpore distance of the porous alumina layer that was formed in the subsequent step increased (Table 4). In the anodization for formation of the porous alumina layer, it is inferred that the processes of Mode III and Mode IV advance through a mechanism which satisfies the above-described proportional relationship between the applied voltage and the thickness of the barrier layer. Also in the cases of the porous alumina layers 90A and 90B and the porous alumina layers 90F to 90I, as the applied voltage of the anodization for formation of the barrier-type alumina layer increased, i.e., as the thickness of the barrier-type alumina layer increased, the interpore distance increased (Table 4) as in the cases of the porous alumina layers 90C to 90E.

As seen from Table 4, the thickness of the barrier-type alumina layer generally had a proportional relationship with the applied voltage. The thickness of the barrier layer of the porous alumina layer increased as the applied voltage increased. In each of the porous alumina layers 90A to 90I, the thickness of the barrier layer was greater than that of the barrier-type alumina layer. Note that, in either case, the entire thickness of the porous alumina layer was about 1.2 µm. Also, the standard deviation of the interpore distance was obtained. In each of the porous alumina layers 90A to 90I and the porous alumina layers 290A and 290B, the standard deviation was about 30% of the average value. That is, the difference in the distribution of the interpore distance was not large among these porous alumina layers.

The present inventors also prepared other 12 types of porous alumina layers by performing the anodization with the use of an ammonium tartrate aqueous solution to form a barrier-type alumina layer and thereafter performing the anodization with the use of a tartaric acid aqueous solution (hereinafter, referred to as porous alumina layers 92A, 92B, 92C, 92D, 92E, 92F, 92G, 92H, 92I, 92J, 92K, and 92L) and carried out an experiment to examine the interpore distance. The experiment is described below.

The base was the same as that used for the above-described porous alumina layers 90A to 90I.

In the process of forming the porous alumina layers 92A to 92H, firstly, the surface 18s of the base 10 was anodized for 2 minutes with the use of an ammonium tartrate aqueous solution (concentration 0.1 mol/L, pH 6.5, solution temperature 23.0° C.), whereby the barrier-type alumina layer 12 was formed. The applied voltage was any of 100 V, 120 V, 150 V, 180 V, and 200 V shown in Table 6, which was applied according to a direct current anodizing method. Then, the anodization was performed with the use of tartaric acid (pH 6.5, concentration 2 wt %, solution temperature 22.0° C.), whereby the porous alumina layer 14 was formed. The applied voltage was any of 200 V and 250 V shown in Table 6, which was applied according to a direct current anodizing method. The anodization was continued till aluminum completely changed into alumina.

In the process of forming the porous alumina layers 92I to 92L, firstly, the anodization was performed for 2 minutes (effective duration) with the use of an ammonium tartrate aqueous solution with the concentration of 0.001 mol/L, pH 6.5, and the solution temperature at 23.0° C., whereby the barrier-type alumina layer 12 was formed. The applied voltage was a pulse voltage. The amplitude of the pulse voltage was any of 280 V, 300 V, 330 V, and 350 V shown in Table 7, the pulse width was 100 msec, and the pulse interval was 900 msec. By applying such a pulse voltage for minutes, the anodization was performed for 2 minutes (effective duration). Then, the anodization was performed for 30 sec with the applied voltage of 380 V with the use of tartaric acid (pH 6.5, concentration 2 wt %, solution temperature 22° C.), whereby the porous alumina layer 14 was formed. The reason why the pulse voltage was applied in the anodization for formation of the barrier-type alumina layer is that, if the anodization was performed using an ammonium tartrate aqueous solution with a high applied voltage of not less than 280 V according to a direct current anodizing method, micropores would sometimes be formed in some portions.

The average values of the interpore distance of the porous alumina layers 92A to 92L (Tables 6 and 7) were obtained in the same way as those shown in Table 4.

TABLE 6

|  | 92A | 92B | 92C | 92D | 92E | 92F | 92G | 92H |
|---|---|---|---|---|---|---|---|---|
| Applied voltage of anodization for formation of barrier-type alumina layer (V) | 100 | 120 | 150 | 180 | 120 | 150 | 180 | 200 |
| Anodization duration for formation of barrier-type alumina layer (sec) | 120 | 120 | 120 | 120 | 120 | 120 | 120 | 120 |
| Applied voltage of anodization for formation of porous alumina layer (V) | 200 | 200 | 200 | 200 | 250 | 250 | 250 | 250 |
| Anodization duration for formation of porous alumina layer (sec) | 600 | 600 | 600 | 600 | 240 | 240 | 240 | 240 |
| Thickness of barrier-type alumina layer (nm) | 142 | 157 | 203 | 230 | 157 | 203 | 230 | 260 |
| Average value of interpore distances (nm) | 306.5 | 316.8 | 319.3 | 325.8 | 371.4 | 388.5 | 405.8 | 440.7 |

TABLE 7

|  | 92I | 92J | 92K | 92L |
|---|---|---|---|---|
| Applied voltage of anodization for formation of barrier-type alumina layer (V) | 280 | 300 | 330 | 350 |
| Anodization duration for formation of barrier-type alumina layer (sec) | 120 | 120 | 120 | 120 |
| Applied voltage of anodization for formation of porous alumina layer (V) | 380 | 380 | 380 | 380 |
| Anodization duration for formation of porous alumina layer (sec) | 30 | 30 | 30 | 30 |
| Thickness of barrier-type alumina layer (nm) | 320 | 340 | 360 | 380 |
| Average value of interpore distances (nm) | 586.7 | 671.1 | 699.2 | 723.3 |

The present inventors also examined the interpore distance of porous alumina layers which were formed without formation of the barrier-type alumina layer. The porous alumina layers were formed by anodizing the surface of the same aluminum base as that described above, with the applied voltage of 200 V, 250 V, and 380 V, with the use of a tartaric acid aqueous solution (concentration 2 wt %, solution temperature 23° C.), till aluminum completely changed into alumina. The formed porous alumina layers are referred to as porous alumina layers 292A, 292B, and 292C. The average values of the interpore distance are shown in Table 8. Note that the standard deviation of the interpore distance was obtained, and the distribution of the interpore distance was examined. The difference in the distribution of the interpore distance was not large among these porous alumina layers.

TABLE 8

|  | 292A | 292B | 292C |
|---|---|---|---|
| Applied voltage of anodization (V) | 200 | 250 | 380 |
| Anodization duration (sec) | 600 | 120 | 24 |
| Thickness of barrier layer (nm) | 256 | 270 | 367 |
| Average value of interpore distances (nm) | 295.8 | 340.9 | 375.9 |

The interpore distances of the porous alumina layers 92A to 92D, 92E to 92H, and 92I to 92L (about 300 nm to about 720 nm) were respectively greater than the interpore distances of the porous alumina layers 292A, 292B, and 292C (about 300 nm to 380 nm) for which the applied voltages were equal in the anodization with the use of a tartaric acid aqueous solution.

Comparing the porous alumina layer 92L and the porous alumina layer 292C for which the voltage applied for formation of the porous alumina layer was highest (380 V), the interpore distance of the porous alumina layer 92L was about 720 nm, whereas the interpore distance of the porous alumina layer 292C was about 380 nm, which is a very small value.

This is probably because, in the porous alumina layer 292C, as illustrated with an example in which oxalic acid was used, the interpore distance was restricted by the grain diameter of crystal grains that form the aluminum film. Note that, when the tartaric acid was used, the interpore distance was restricted to about twice the average grain diameter. The reason why the interpore distance obtained was greater than in the case where the oxalic acid was used is probably that the tartaric acid had a smaller power to dissolve alumina than the oxalic acid so that the density of formation of the micropores (the number of micropores per unit area) was small.

The thickness of the barrier-type alumina layer had a proportional relationship with the applied voltage. Thus, as the applied voltage of the first anodization cycle increased, the thickness of the barrier-type alumina layer also increased.

Comparing the porous alumina layers 92A, 92B, 92C, and 92D among which the applied voltage of the anodization for formation of the porous alumina layer was equal, the interpore distance increased as the thickness of the barrier-type alumina layer increased. Also in the cases of the porous alumina layers 92E to 92H and 92I to 92L, the interpore distance increased as the thickness of the barrier-type alumina layer increased. It is inferred that, in the anodization for formation of the porous alumina layer, the operations of Mode III and Mode IV advance through a mechanism which satisfies the above-described proportional relationship between the applied voltage and the thickness of the barrier layer. Thus, the interpore distance of the porous alumina layers 92A to 92L which were formed with the use of a tartaric acid aqueous solution exhibited similar tendencies to those of the porous alumina layers 9A to 90I which were formed with the use of an oxalic acid aqueous solution.

As seen from the comparison of Tables 6 and 7 and Table 4, the porous alumina layers 92A to 92L had greater interpore distances than the porous alumina layers 90A to 90I. Particularly, the porous alumina layers 92G to 92L had interpore distances of not less than 400 nm.

A porous alumina layer whose interpore distance is not less than 400 nm, for example, can be used as a moth-eye mold that is for use in manufacturing an antireflection film in which the interval of protrusions that form the moth-eye structure is not less than 400 nm. An uneven structure which is provided for the purpose of improving the light condensing efficiency of the surface of a solar cell, for example, can be formed using a mold which has a porous alumina layer whose interpore distance is not less than 400 nm. Also, the mold which has a porous alumina layer whose interpore distance is not less than 400 nm can be used as a mold for formation of photonic crystal.

The present invention has been described above with an example in which a deposited aluminum film is used. However, the present invention is also applicable to a case where a bulk of an aluminum material is used. In that case, a barrier-type alumina layer is formed beforehand so that micropores can be formed without being restricted by the surface shape. Therefore, a porous alumina layer which has a large interpore distance can be formed. Even when an aluminum base which has a relatively flat surface is used, a porous alumina layer which has an interpore distance of a desired magnitude can be formed by forming a barrier-type alumina layer.

In the moth-eye mold fabrication method of the embodiment of the present invention which has previously been described with reference to FIGS. 1(a) to 1(e), the step of forming a barrier-type alumina layer beforehand is performed prior to the step of forming the porous alumina layer, whereby a moth-eye mold which includes a porous alumina layer that has an interpore distance of a desired magnitude can be fabricated.

INDUSTRIAL APPLICABILITY

The present invention is applicable to a mold for formation of an antireflection film. The antireflection film is applicable to various uses of which antireflection is demanded, typically to optical elements for use in display devices or the like.

REFERENCE SIGNS LIST 10 base
14 porous alumina layer
14p micropore (inverted moth-eye structure)
16 substrate
18 aluminum film
100A moth-eye mold

The invention claimed is:

1. A method of fabricating a mold that has an inverted moth-eye structure in its surface, the inverted moth-eye structure having a plurality of recessed portions whose two-dimensional size viewed in a direction normal to the surface is not less than 50 nm and less than 500 nm, the method comprising the steps of:
    (a) anodizing a surface of an aluminum base to form a porous alumina layer which has a plurality of minute recessed portions;
    (b) after step (a), bringing the porous alumina layer into contact with an etching solution, thereby enlarging the plurality of minute recessed portions of the porous alumina layer; and
    (c) after step (b), further anodizing the surface of the aluminum base to grow the plurality of minute recessed portions,
    wherein a voltage applied in step (c) is higher than a voltage applied in step (a).

2. The method of claim 1, wherein a number density of the minute recessed portions after step (c) is less than 1.26 times a number density of the minute recessed portions after step (a).

3. The method of claim 1, wherein step (a) and step (c) are performed in a same electrolytic solution.

4. The method of claim 3, wherein a growth rate in a thickness direction of the porous alumina layer in step (a) is smaller than a growth rate in a thickness direction of the porous alumina layer in step (c).

5. The method of claim 1 further comprising, before step (a), the step (d) of anodizing a surface of the aluminum base to form a barrier-type alumina layer.

6. The method of claim 1, wherein an average value of intervals of centers of the plurality of minute recessed portions is not less than 180 nm.

7. The method of claim 1 wherein, after step (c), step (b) and step (c) are further performed.

8. The method of claim 1, wherein the aluminum base includes a substrate and an aluminum film deposited on the substrate.

* * * * *